United States Patent
Malchi et al.

(10) Patent No.: US 7,451,059 B2
(45) Date of Patent: Nov. 11, 2008

(54) TRUE AZIMUTH AND NORTH FINDING METHOD AND SYSTEM

(76) Inventors: Tomer Malchi, 18 Michal Street, 62361 Tel-Aviv (IL); Yaniv Malchi, 18 Michal Street, 62361 Tel-Aviv (IL)

( * ) Notice: Subject to any disclaimer, the term of this patent is extended or adjusted under 35 U.S.C. 154(b) by 205 days.

(21) Appl. No.: 11/492,134

(22) Filed: Jul. 24, 2006

(65) Prior Publication Data

US 2007/0010965 A1    Jan. 11, 2007

Related U.S. Application Data

(63) Continuation-in-part of application No. 11/205,697, filed on Aug. 17, 2005, now Pat. No. 7,107,179.

(30) Foreign Application Priority Data

Mar. 2, 2003   (IL) .................................... 154701
Jan. 15, 2006  (IL) .................................... 173149

(51) Int. Cl.
*G08B 21/00* (2006.01)

(52) U.S. Cl. .................. 702/151; 702/92; 702/150; 702/152; 702/153; 342/357.14; 342/458; 342/29; 340/945; 340/961; 340/970; 340/963; 340/968

(58) Field of Classification Search .............. 702/92, 702/150–153; 340/945, 961, 970, 968; 342/29, 342/357.14, 458; 701/200, 207–208, 224–225
See application file for complete search history.

(56) References Cited

U.S. PATENT DOCUMENTS

4,954,837 A * 9/1990 Baird et al. ................. 342/458

(Continued)

FOREIGN PATENT DOCUMENTS

GB         2 254 214 A         9/1992

OTHER PUBLICATIONS

Stiles P. N. "Terrain Intervisibility believe it or not?" Digital Avionics Systems Conferences, 2000, Proceedings, DASC. The 19th Oct. 7-13, 2000, Piscataway, NY, USA, IEEE, vol. 2, Oct. 7, 2000, pp. 5A21-5A27, XP010522734, ISBN: 0-7803-6395-7.

(Continued)

*Primary Examiner*—John E. Barlow, Jr.
*Assistant Examiner*—Sujoy K Kundu
(74) *Attorney, Agent, or Firm*—Frishauf, Holtz, Goodman & Chick, P.C.

(57) ABSTRACT

A method and a system are recited for obtaining a true azimuth heading for correcting a coarse azimuth heading measured from an observation position to a specific selected target by operating a data acquisition system disposed at the observation position. In principle, data is acquired and measurements are taken to allow calculation of a calculated target, including error area limits. The calculated target surrounded by error area limits is presented as a search zone to an operator for searching, finding and indicating on a display, on which is superimposed at least one map, of the specific selected target. Once found, calculations of the true azimuth are performed, allowing the derivation of the true North. The method and a system are operative with a variety of maps, including digital terrain models and stellar maps.

50 Claims, 12 Drawing Sheets

U.S. PATENT DOCUMENTS

| | | | |
|---|---|---|---|
| 5,086,396 | A | 2/1992 | Waruszewski, Jr. |
| 5,825,480 | A | 10/1998 | Udagawa et al. |
| 6,064,942 | A | 5/2000 | Johnson et al. |
| 6,222,464 | B1 * | 4/2001 | Tinkel et al. ............. 340/945 |
| 2002/0180636 | A1 * | 12/2002 | Lin et al. ............. 342/357.14 |
| 2004/0041999 | A1 | 3/2004 | Hogan et al. |

OTHER PUBLICATIONS

Yacoob, Y. Et al., "Computational Ground and Airborne Localization over Rough Terrain" Proceedings of the Computer Society conference on Computer Vision and Pattern Recognition, Champaign, IL, Jun. 15-18, 1992, New York, IEEE, US, Jun. 15, 1992, pp. 781-783, XP010029406, ISBN: 0-8186-2855-3.

International Preliminary Report on Patentability and Written Opinion dated Apr. 14, 2005, of International Application No. PCT/IL2004/000198 filed Mar. 1, 2004.

Moccia, A.; Vetrella, S; Ponte, S; Passive and Active Calibrator Characterization Using a Spaceborne SAR System Simulator; IEEE Transactions on Geoscience and Remote Sensing vol. 32, iss. 3, May 1994; pp. 715-721.

* cited by examiner

TRUE AZIMUTH AND NORTH FINDING METHOD AND SYSTEM

The present application is a continuation in part of U.S. patent application Ser. No. 11/205,697 filed on Aug. 17, 2005, now U.S. Pat. No. 7,107,179, and is related to IL Patent Application Nos. 154701 filed on Mar. 2, 2003 and 173149 filed on Jan. 15, 2006, the priority dates of which are claimed herein, and the contents of all three applications being incorporated herewith in whole by reference.

FIELD OF THE INVENTION

The present invention relates in general to the field of navigation, and more particularly to method s and systems for finding a true azimuth, the true North and position location data.

BACKGROUND ART

Sighting means for target data acquisition are well known per se. These optical instruments are used by geodesists and by artillerists for example. Such equipment is comparable to a theodolite or transit compass, with a turntable for pointing a telescope toward a target. Typically, a compass, a computer with a CPU for running computer programs, an I/O unit, a memory, and a display device, or simply display, are included. Tilt and yaw angles from an observation site to a target are measured with a vernier. Most often, an active range-measuring device, such as an LRF, is also included.

It is taken for granted that modern sighting devices all include an optical device, e.g. a telescope or binoculars, and have to be powered-up and leveled before use. Optics, power-on, and leveling are standard and common practice in the art, and will therefore not be mentioned in the description below.

Also known in the art is the acronym DTM (digital terrain model), or DEM (digital elevation model) referring to a digitized topographic model, which provides a representation of a portion of terrain surface contour in the form of a three-dimensional digital map. Parties performing surface or volumetric calculations with respect to the modeled terrain, possibly make use of such a DTM. When the DTM is stored in a computer memory, it can be used as a unit in a terrain database. The stored DTM then provides the basic data for running surface and volumetric calculations implemented by a computer program associated with a computer and a computer memory. Various engineering, military and environmental related applications frequently refer to DTMs for surface or spatial calculations. A graphic illustration of a DTM is given in FIG. 1, to which reference is now made.

FIG. 1 shows a DTM surface S derived from a DTM database, associated with an (x,y,z) Cartesian-coordinate system, having a plane of grid points with (x,y) coordinates in the x-y plane. A (z) height-coordinate is defined for each discrete couple of (x,y) coordinates. Each point sampled on the terrain surface contour is represented by a junction of X and of Y lines in the grid. The height of each sampled point is given by values along the Z axis. The resolution of the sampling points of the DTM in the X-Y plane, and the accuracy of the height measurement of each sampled point depend on several factors, for example, on the quality of aerial photography from which the map was prepared.

In U.S. Pat. No. 5,086,396, Waruszewsky Jr. discloses "an aircraft navigation system" including "an inertial navigation system, a map of the terrain with elevation information stored in a digitized format as function of location, a typical energy managed of narrow (radar or laser) beam altimeter, a display system, and a central processing unit for processing data according to preselected programs." This is an example of the use of a DTM for navigational purposes. Waruszewsky Jr. further points out that "The correct position of the aircraft with respect to the digitized map can permit the aircraft to engage in terrain following procedures using only the difficult to detect altitude range finding apparatus as a source of emitted electromagnetic radiation." Hereby, Waruszewsky Jr. hereby refers to the problems associated with the detection of active sensors.

In U.S. Pat. No. 6,222,464, Tinkel et al. divulge "A method of automated scan compensation in a target acquisition system for reducing areas of potential threat surrounding an aircraft. The target acquisition system includes a scanning device with adjustable scan limits for scanning a desired area in the vicinity of the aircraft. "In their invention, Tinkel et al. make use of adjustable scanning limits to define a scanned area.

In the published US Patent Application No. 20020180636 A!, Lin, Chian-Fang, et al. teach a passive ranging/tracking processing method that provides information from passive sensors and associated tracking control devices and GPS/IMU integrated navigation system, so as to produce three dimensional position and velocity information of a target. The passive ranging/tracking processing method includes the procedure of producing two or more sets of direction measurements of a target with respect to a carrier, such as sets of elevation and azimuth angles, from two or more synchronized sets pf passive sensors and associated tracking control devices, installed on different locations of the carrier, computing the range vector measurement of the target with respect to the carrier using the two or more sets of direction measurements, and filtering the range vector measurement to estimate the three-dimensional position and velocity information of the target. Use is made of passive sensors, but there are needed two or more synchronized sets of passive sensors.

In U.S. Pat. No. 5,825,480, Udagawa recites "an observing apparatus which can instantly and correctly specify the current position of an object to be observed.". Udagawa "computes the position at which a line extending from the own position to the observing direction initially crosses the surface of the earth." and adds that "The coordinates of thus computed position represents the observation target, . . . ". With Udagawa there is no mention of any computed position error due to errors inherent to input measurements, or of one or more error zones, or of hidden areas.

In U.S. Pat. No. 6,064,942, Johnson et al. recite "an enhanced precision forward observation system and method using a satellite positioning system receiver integrated with a laser range finder and a compass." It is thus clearly stated in Johnson et al. that use is made of a laser range finder, which is an active range finding device that emits radiations, and cannot achieve passive range and data acquisition. Furthermore, Johnson et al. apply mathematical methods, including statistic computations and the use a Kalman filter that "allows multiple measurement integration as well as calculation of reliable error statistics".

In "Terrain Intervisibility—Believe it or Not", published in "The 19th 7-13 Oct. 2000 Proceedings", the Digital Avionics Systems Conferences, Oct. 7, 2000, Peter N. Stiles makes no mention of passive range and data acquisition of a sighted target. Stiles recites intervisibility between an enemy and an aircraft with respect to terrain topography.

In "Computational Ground and Airborne Localization over Rough Terrain", published in the Proceedings of the Computer Society Conference on Computer Vision and Pattern Recognition, Jun. 15, 1992, Yacoob et al. perform localization by use of an altimeter, a compass, an inclinometer and a range finder. Since active radiation-emitting equipment is used, there is no passive range acquisition involved. Nevertheless, Yacoob et al. recognize measurement errors which they define as an uncertainty cone, and define an active set, containing all the points on the surface of the DTM and within the elevation error range. Finally, Yacoob et al. test all the points on the terrain surface to determine if they fall within the uncertainty cone, and the visibility of all the points in the uncertainty cone is examined. Yacoob et al. do not recite passive range acquisition, do not recite an uncertainty area delimited by the intersection of the mantle of the uncertainty cone with the DTM, and do not display the uncertainty zone.

In U.S. Pat. No. 4,954,837, Baird et al. recite "Terrain Aided Passive Range Estimation", "by which data as to the present position (including longitude, latitude, and altitude) and attitude of a sensor platform and stored terrain data are used to calculate an estimated range from the platform to a ground-based target or threat, and the estimated range is then processed by a Kalman filter to increase the accuracy of the calculated range. In accordance with the present invention, sensory angular data, owncraft positional data (i.e., data as to the position of the sensor platform), and stored digital terrain data are fused together to derive accurate threat/target location.". Baird et al. explain that "The Kalman filter has better observability characteristics due to the availability of this pseudo-measurement of range derived from the line of sight (LOS) intersection with the stored terrain data base.", and also that "Range estimation can be improved by processing multiple looks at a threat/target, using the motion of the platform to triangulate and using time integration of multiple measurements to filer noise, thereby improving passive target location estimation.". It is thus clear that Baird et al. thus rely on line of sight intersection with the stored terrain database, the use of a Kalman filter, and do not calculate and recite an error area.

In GB Patent No. 2254214, George Brown recites an Imaging System using a radar altimeter, which is not a passive range acquisition device. Brown recites that "The range map derived by unit 12 is only approximate for reasons described above and hence bands of ranges are formed as shown in FIG. 3 rater than a series of discrete individual ranges. However, this level of accuracy is generally sufficient to be able to discriminate between different types of target object.".

In view of the shortcomings of the prior art it is thus desirable to simply display to the operator the error zone or zones containing the target as well as hidden zones for the derivation of the true azimuth, the true North, and of the location data of the observation position.

DISCLOSURE OF THE INVENTION

The problems solved by the present invention are twofold. First comes the problem of passive range and data acquisition of a sighted target, without emitting radiations. The second problem is that of starting with a coarse north direction to quickly obtain an accurate north indication, where accurate is defined as precise to ±1 mill.

The second problem is solved by two different methods. The first method uses the PTAS as a building block fed with actively measured range data toward a reference target. An accurate north finding procedure or NFP supports the evaluation of both calculated and measured data for deriving accurate north. The second method achieves super-rapid north finding (SRNF) based on the inherent capabilities of the PTAS when a singular target is available, as will be described below.

The first problem is thus to acquire target data without emitting signals, such as those radiated by a RF or laser device to prevent detection of the sighting by other parties. To solve the first problem, the invention uses a target data acquisition system (PTAS) with sighting means, operated from an observation position, with further means for accepting as input data, the location of the observation position, elevation angle and azimuth angle to the target, and further mean for processing the obtained input data in association with a DTM (digital terrain model). The terms DTM, DTM database, DTM surface are used interchangeably below, and so are the terms observation site, observation position, and observation position.

The PTAS processes the input data and calculates an intersection point of a line of sight (LOS), also referred to as sighting vector or simply vector, emanating from the observation position and directed toward a target, which intersection point designates the location of the target. Since the target is now a known point on the DTM surface derived from the DTM database, the target data are also known and available in digital format for further processing and even for transmission of data if desired. The operator is presented with a display of the DTM on which the target is pointed out, and over which one or more other maps or pictures may be superimposed, such as for example, a topographic, a satellite, an ortho-photo, or an aerial photography map. The terms Line of Sight (LOS), sighting vector, and vector are used interchangeably below.

It is taken for granted that reference to a display on a display module, or presentation on display, refers to both graphical and alphanumerical data, or associated information related or not to the graphical information. Target data and associated information are defined as desired regarding to their contents and presentation. The operator may select to view the information he desires as both or either only graphical or numerical data, by help of the I/O unit referred to above.

The PTAS also accepts as input the various inaccuracies of the input data, such as instrument inaccuracies in azimuth and in elevation angle, which are shown on the display as an area of uncertainty, or error area, related to the location of the target, in addition to the calculated target location. This feature is achieved by defining the measurement inaccuracies as an envelope surrounding the sighting vector, where the term envelope is used as a generic name for a three dimensional shape representing measurement inaccuracies. Calculation of the intersection of the envelope with the terrain surface contour of the DTM is shown on the display as an error area associated with the designated target.

It sometimes happens that the sighting vector hits a first portion of terrain, say a first forefront hill, which partially obscures a second background hill, whereby the envelope shrouding the sighting vector marks the DTM terrain surface contour on both the forefront and the background hill, forming two different separated apart error zones of the same target. To the operator this is a warning that the target may reside in either one of both error areas, and that the range to the target may vary accordingly.

Furthermore, when the envelope surrounding the sighting vector leaves more than one trace on the terrain, warning is provided that a "dead zone" or "hidden ground", or a terrain fold separates those traces, hiding entire surfaces from view. Such knowledge is of great importance to search parties, both for the rescue of survivors and for the arrest of smugglers.

Obtaining an accurate north reading is a second problem. The PTAS is instrumental as a basic building block, in association with an accurate north finding procedure NFP, for the fast determination of the accurate north direction. In this case, a coarse azimuth is sufficient when provided as input data of the PTAS, but an active range measurement device, such as a laser range finder (LFR) is required. Based upon the coarse azimuth reading and a few selected reference targets appropriately chosen on the DTM, a range to each reference target is calculated by the PTAS, and stored in memory. Then LRF readings to the same reference targets are taken, according to the data calculated by the PTAS, such as azimuth and elevation to the reference targets, and stored in association with the respective calculated reference target ranges. Next, the NFP is operated to find a common deviation factor that when applied as a common correction factor, will adjust the azimuth of the calculated and of the measured ranges. The common correction factor is the correction factor by which the coarse azimuth reading has to be corrected to indicate accurate north direction.

The method and system of the present invention are operable continuously from an observation position, which is land-based, sea borne, airborne, or based in space. Typically, a stabilized platform is advantageous for implementations that are operated when in motion, on land, sea, in the air and in space.

Development prototypes of the PTAS have been successfully operated in four specific fields of operation, namely transportation, military, paramilitary, and search and rescue applications. In relation to transportation systems, specifically for navigation, collision avoidance, and coastal navigation use. With the military, as add-ons for hand held items such as personal binoculars and light weapons, manned and unmanned airborne vehicles, including missiles and observation balloons, and also for target designation and tracking. Police, border patrols, and custom units have adopted the PTAS mainly for observation purposes and intrusion prevention, whereas for search and rescue activities, range and waypoint determination were tested.

For land-based field use, the time needed for deployment of commonly used systems ranges between 2 to 5 minutes from arrival at the observation position until acquisition of target data, whereas with the present invention, not more than one minute is necessary.

The following results were collected for 153 tests carried out with development units, for passive range measurement under various conditions: In 142 cases, representing about 92% of instances, range was and target data was calculated to an accuracy of ±20 m, for ranges between 100 m and 10000 m. Six more target data readings, or 4% were correct up to ±50 m, whereas the remaining 5 readings were off-range by more than 100 m.

It is an advantage of the present invention to provide a method and a system for passive target data acquisition, without emission of detectable radiations.

Moreover, the present invention allows avoiding the high cost, the weight the volume and the maintenance costs of the LRF device.

Another advantage is the presentation on display of error zone(s) due to input data inaccuracies. Furthermore, "dead zones" are detected and designated as such.

An additional advantage of the present invention is the ability of the PTAS to operate continuously, in contrast with the intermittent operation of a LRF.

Still further, there is implemented a NFP for quickly positioning to the accurate north, even though a coarse azimuth input means is used.

A further advantage is the ability of operating when handheld, and in motion, on land, sea or in the air, where motion relates to both motion of the PTAS and of the target. In other words, the system can derive accurate target data with great efficiency, both when the PTAS is in motion and when tracking a moving target.

The concept described in detail hereinbelow is advantageous for application to a plurality of embodiments permitting to obtain a true azimuth heading, to derive therefrom the true North, and in particular cases, to obtain position location data.

SUMMARY

It is an object of the present invention to provide a method and a system for passive target data acquisition system (PTAS) for passively sighting a target from an observation position so as to acquire target data therefrom and associated information. Target data is for example range to the target, azimuth angle, elevation angle, and target location. Associated information is any additional information such as waypoint, altitude, and particular data. Target data and associated information shown on a display in graphic and alphanumeric representation are available for output in digital format, and ready for transmission.

It is thus an object of the present invention to provide a method using a passive target data acquisition system (PTAS) operative from an observation position for passively sighting a target. The PTAS comprises:
   passive sighting means coupled to a navigation device and to azimuth and elevation angle measuring devices
   a computer module operatively coupled to a DTM database module, to the sighting means, and to a display.

The method comprises the steps of:
   measuring location data of the observation position, and azimuth and elevation angle data to the target, and
   feeding measured data to the computer module and presenting on the display both the observation position and the target on a corresponding DTM surface derived from the DTM database.

The method is characterized by comprising the steps of:
   directing a vector toward the target and defining an envelope surrounding the vector originating at the observation position, and an envelope mantle distanced away from the vector proportionally to errors of measurement,
   running a PTAS computer program on the computer module for calculating intersection points of the vector and of the envelope with the DTM surface, and
   presenting the intersection points and associated information on the display, whereby target data is acquired passively to avoid emission of radiations.

The method further comprising the steps of running the PTAS computer program to derive a distance separating between intersection points selected on the DTM surface, and deriving a range measurement separating the observation position from the target. Moreover, the method and system further comprise the steps of operating uninterruptedly for continuously deriving measured and calculated data, and
   operating uninterruptedly to continuously provide target range, target location data, and associated information.

It is a further object of the present invention to provide steps for detecting the existence of dead zone(s) distributed along the vector, between the observation position and the target, and
   mapping the dead zone(s) on the display. In addition, the system and method comprise
   feeding the PTAS computer program with selected data comprising position location, LOS vector length, azimuth and elevation angles, and running the PTAS computer module to display dead zones of terrain and associated information, according to the selected data.

It is another object of the present invention to provide sighting a target from an observation position located above the DTM surface and situated on an airborne platform on land, at sea, in the air or in space, and supported on a stabilized platform if desired.

It is yet an object of the present invention to provide a system and a method for rapidly finding accurate north direction, comprising: obtaining at least a coarse north direction reading for input into the computer module, and characterized by comprising the steps of:

running a north-finding procedure computer program on the computer module for determining an observation zone sector, dividing the observation zone into sub-sectors and defining reference targets, using an active range measuring device to actively measure range from the observation position to at least one reference target, feeding the at least one actively measured range into the computer module, and running the NFP computer program for calculating deviation in azimuth data to the at least one reference target by respectively associating range as calculated by the PTAS and range as actively measured for deriving a common azimuth deviation factor providing a correction factor for indicating the accurate north. Although reference was made to at least one reference target, two and more reference targets are preferably used.

This comprises dividing the observation zone automatically into sub-sectors, and selecting randomly one reference target in at least one sub-sector, or in each one of at least two non-adjacent sub-sectors, and defining a selected reference target as a locus for which each small azimuth deviation of the sighting vector encounters a large change in range.

The system and method further comprise the steps of:

running the NFP computer program for calculating whether adjustment of the observation position location reduces the value of the common deviation factor, and adjusting the observation position location when the accordingly calculated adjustment reduces the value of the common deviation factor.

In a first embodiment 1000, the present application provides a method and a system for obtaining a true azimuth heading for correcting a coarse azimuth heading measured from an observation position to a specific selected target by operating a data acquisition system disposed at the observation position.

The data acquisition system has a computer module running computer programs including at least one dedicated computer program and at least one map. Furthermore, the data acquisition system has a computer display coupled to the computer module for displaying output data to the operator in superimposition onto the at least one map. The computer display responds to an operator input designating a selected location thereon by operation of the computer module for retrieval of location data of the selected location, and for replacement of location data for a previously calculated location with location data of the selected location.

The data acquisition system also has a sighting device aimed at the specific selected target and coupled to the computer module.

The sighting device has access to a source of location data, and has devices for measuring target data, including measurement of elevation angle, relative horizontal yaw angle, coarse azimuth heading, and means for deriving range data. Location data and measured target data are fed as input into the computer module. It is noted that the range is obtained from any available source.

The method and system comprise the steps of:

feeding input data into the computer module including location data, target data and associated errors limits, and operating the computer module for:

displaying the at least one map selected according to observation position location data, running the at least one dedicated computer program to provide calculated target location data for the specific selected target according to input data, and to calculate an error area delimited by data error limits and displayed as a search zone, the calculated target location being disposed within the search zone containing the specific selected target, and superimposing the search zone on the at least one displayed map, prompting the operator to search within the search zone limits shown on the display module for the true location of the specific selected target, which when found and indicated, operates the computer module for:

retrieval of location data of the specific selected target, and replacement of location data of the previously calculated target location with the true location data of the specific selected target, and operating the at least one dedicated computer program to calculate and accept the sighting device heading aimed at the specific selected target as the true azimuth, to feedback the true azimuth to the sighting device, and to display calculation result data, whereby the data acquisition system provides true azimuth from which a true North direction may be derived and used as input for further operation.

In a second embodiment 2000, the present application also provides a method and a system for obtaining a true azimuth heading for correcting a coarse azimuth heading measured from an observation position to a selected sighted celestial body by operating a data acquisition system disposed at the observation position. In this embodiment the data acquisition system position to a sighted celestial body, and the computer module runs computer programs including at least one dedicated celestial computer program and at least one celestial map.

The sighting device, which is aimed at the sighted celestial body, is coupled to the computer module for input therein of data including location data and target data. The sighting device has access to a source of location data, and is equipped with target data measuring devices to measure elevation angle and coarse azimuth heading, for the measured data, including observation position location data, elevation angle and coarse azimuth heading and measurement-associated errors limits to be fed as input data into the computer module. The computer module is operated for displaying at least one celestial map selected according to the observation position location data, current date and current time, and for running the at least one celestial computer program to provide calculated star location data for the sighted celestial body according to input data, and to calculate an error area displayed as a search zone delimited by data error limits, the calculated star location being disposed within the search zone containing the sighted celestial body.

Furthermore, the computer module is operated for superimposing the search zone on the at least one displayed celestial map.

In turn, the operator is prompted to search within the search zone limits shown on the computer display module for the true sighted celestial body, and when found and indicated, to operate the computer module. It is now to the computer module to operate for retrieval of location data of the sighted celestial body, and for replacement of location data of the previously calculated star location with the true location data of the sighted celestial body as corrective data for input into the computer module.

Then, the at least one celestial computer program is operated to calculate and accept the heading of the sighting device aimed at the sighted celestial body as the true azimuth, feed back the true azimuth to the sighting device, and provide calculation result data, whereby the data acquisition system provides true azimuth from which a true North direction may be derived and used as input for further operation.

In a third embodiment 3000, the present application provides a method and a system for operation of a data acquisition system in a GPS deficient environment or with an inoperative GPS receiver, as a procedure to derive a true azimuth and observation position location data.

The data acquisition system has a sighting device that is aimed at a specific selected target that is chosen and recognized by the operator and for which location data are available. It is to the operator to select at least one appropriate map for display on the computer display.

Then, the operator is prompted to find the specific selected target on the computer display, and when found and indicated, to operate the computer module for retrieval of location data of the specific selected target, together with error limits, for input into the computer module. The sighting device is now operated to derive and feed coarse azimuth heading, relative horizontal yaw angle, elevation angle, range, and associated data error limits, as input data into the computer module.

In turn, the computer module is commanded to accept the specific selected target having known location data as a temporary observation position, and accept the actual observation position having unknown location data as a temporary target, by adding p radians to or subtracting p radians from the measured coarse azimuth heading and by multiplying the measured elevation angle by −1.

Moreover, the computer module is operated to run a dedicated computer program to calculate and display the temporary target surrounded by a search zone, which is delimited by the error limits of the range and of the coarse azimuth heading, and to display the specific selected target location.

Finally, the operator is prompted to search within the search zone limits shown on the computer display for the true location of the temporary target, and when found and indicated, replaces the location data of the temporary target with the location data of the actual observation position as input into the computer module.

Thereby a true azimuth is obtained from which a true North direction may be derived, in addition to the location data of the observation position, all useable as input for further operation.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

BEST MODES FOR CARRYING OUT THE INVENTION

Figure 1:
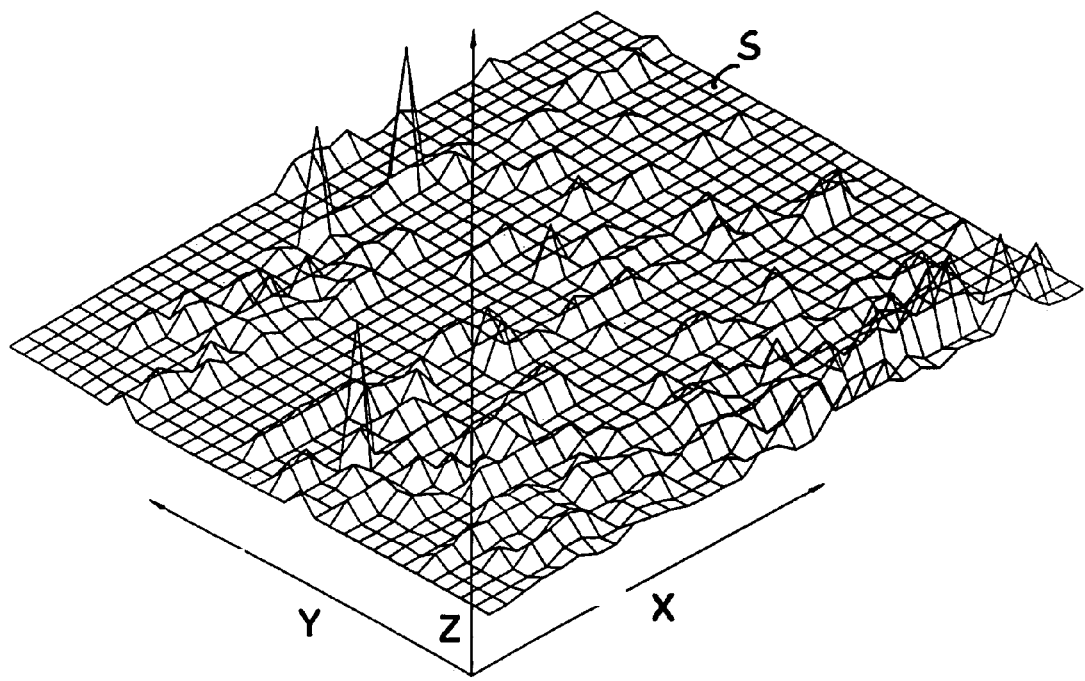
FIG. 1 is a schematic description of a DTM known in the art.
Figure 2:
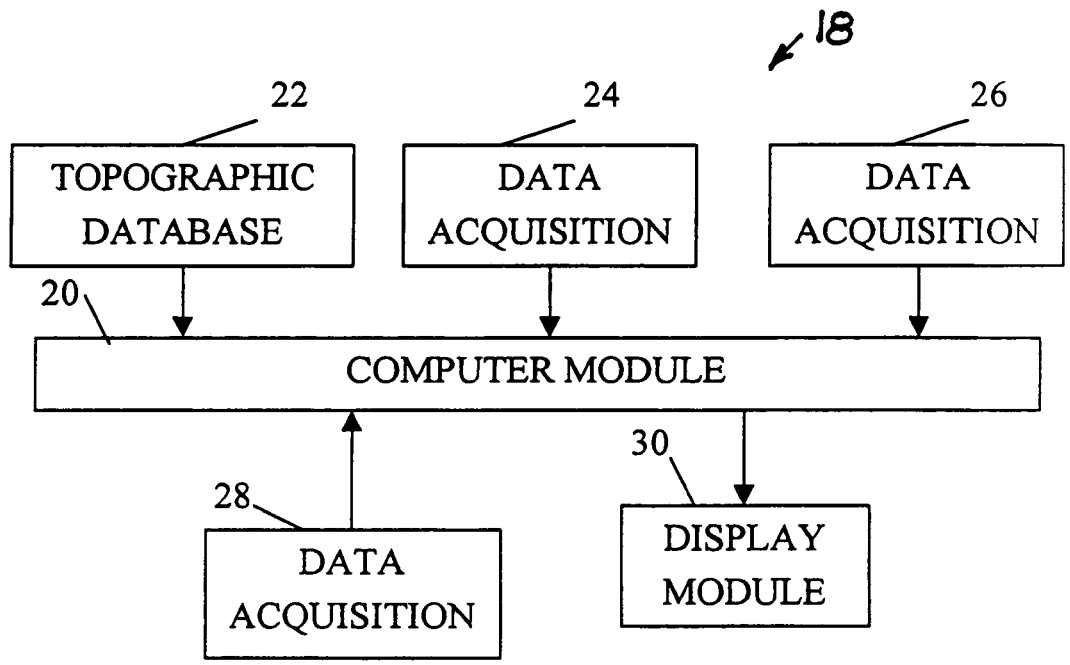
FIG. 2 is a schematic architectural scheme of a passive target data acquisition system of the PTAS.

As seen in FIG. 2 to which reference is now made, a passive target data acquisition system (PTAS) 18 of the invention contains a computer module 20, a topographical or DTM database 22, or a link to such a database, a plurality of passive data acquisition modules 24, 26 and 28, and a display module 30, or display 30. The general setup described schematically in FIG. 2 indicates the connections of the topographic database and of the acquisition modules, with the associated computer module, to which passively collected spatial data is furnished, as will be explained below. As stated above, sighting means are regarded as being inherently included but are not described since well known to the art. The terms DTM, DTM module, DTM database, topographic database are used interchangeably. A DTM surface and DTM surface contour are derived from the DTM module.

Passive data acquisition collected at the observation position contrasts with active data acquisition, which relates to radiation-emitting means. Sometimes, it is desired to conceal the location of the observation position and to avoid the emission of radiations. The advantage of passive data acquisition means is that they are practically, or at least much more difficult to detect than are active data acquisition means, which generally emit some kind of radiation, possibly detectable by other parties. Another advantage is the low cost of the system, when compared to the cost of an active range-measuring device such as an LRF.

Figure 3:
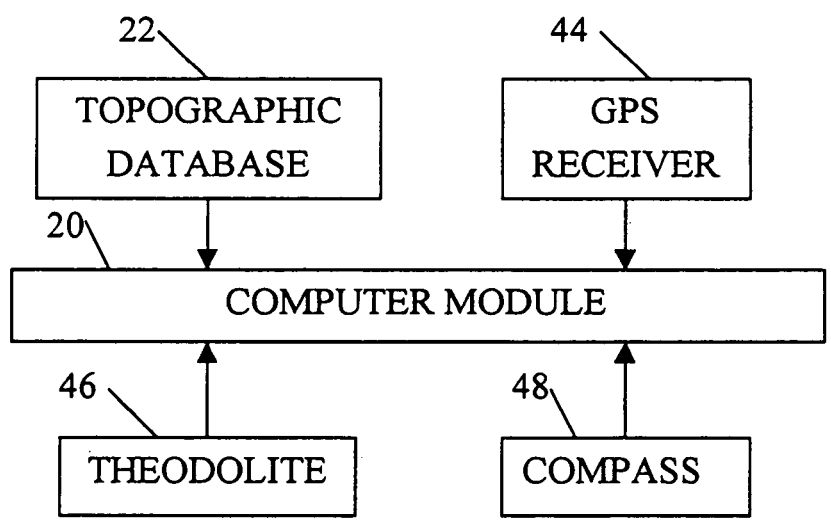
FIG. 3 is a scheme describing data flow respective to the computer module.

The PTAS locates a target in the three dimensional space defined by an existing DTM database, by use of a target data acquisition process TAP. The information obtained by the passive data acquisition modules of the PTAS is used to define the origin and the direction of a vector v. The origin of the vector v is the observation position with the PTAS, which origin location can be measured by a navigation data device, typically a GPS (Global Positioning System) receiver, as is explained with reference to FIG. 3. Typically, the computer module 20 receives location data from a navigation device or data source such as a GPS receiver 44, elevation angle to the target from a suitable measuring device, such as a theodolite 46, and azimuth angle data from an orientation measuring device, possibly a compass 48, but preferably a better-resolution orientation measuring device. The term elevation is used as a general expression regarding the measurement of an angle in a vertical plane. The elevation angle is taken as positive upward of a horizontal plane passing through the observation position, and as negative in the opposite direction.

The PTAS resides at the observation position taken as the origin of the DTM for the purpose of calculations. The operator of the PTAS is either present in situ or situated at a remote station. The vector v is the line of sight (LOS) from the observation position to the target. As already pointed out above, it is taken for granted and assumed below that the PTAS has first to be assembled, if necessary, has sighing means, is powered-up and leveled, before becoming operative.

Figure 4A:
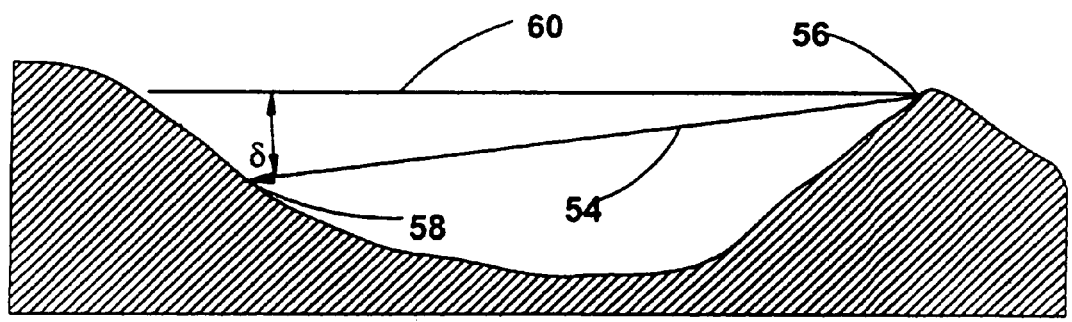
FIG. 4A is a schematic illustration of the elevation angle as measured by the system of the PTAS.
Figure 4B:
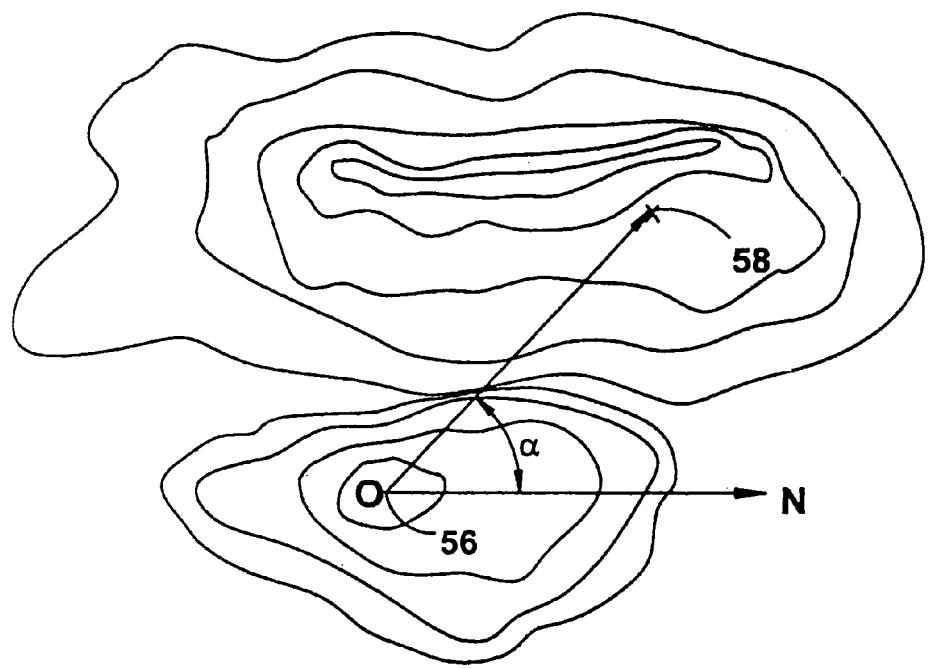
FIG. 4B is a schematic description of the azimuth angle as measured by the PTAS.

The elevation angle is illustrated in FIG. 4A to which reference is now made. FIG. 4A illustrates a cross-section cutting through the terrain model, the straight line 54, or line of sight (LOS) connecting between the observation position 56 where the PTAS resides, and the target at point 58. The straight line 54 and the horizontal line 60 form an angle d, which is the elevation angle. The azimuth a is depicted in FIG. 4B which refers to a topographic map. Azimuth a is the angle between the north N, designated by an arrow marked N, and the LOS to the target at point 58, as seen from the observation position 56.

Once the passively obtained spatial information, namely the position, or the location, of the observation position, the elevation angle, and the azimuth angle, has been entered, the computer module can calculate the intersection point of the vector v with the DTM surface derived from the DTM database. This means: the intersection point of the vector v with the DTM contour curve of the terrain in the vertical plane wherein the vector v resides. Since the DTM is a discrete model, with a typical distance of say 10 meters between each sampling point, although the height accuracy for each sampled point is high, interpolation algorithms that are applied to define a more dense coverage of the area are accurate to only typically ±5 to 10 meters.

Bilinear or cubic algorithms can be used to calculate the interpolation points. Bilinear interpolation generates a terrain surface representation built as planar quadrilateral elements, each having one corner with a common z-coordinate of the DTM. This means that two opposite sides of the quadrilateral element are aligned with the x-axis while two other perpendicular sides thereof are co-directional with the y-axis. Cubic interpolation is achieved by casting a geometrically continuous plane atop the z-coordinates to approximate the various DTM points as closely as possible.

Figure 4C:
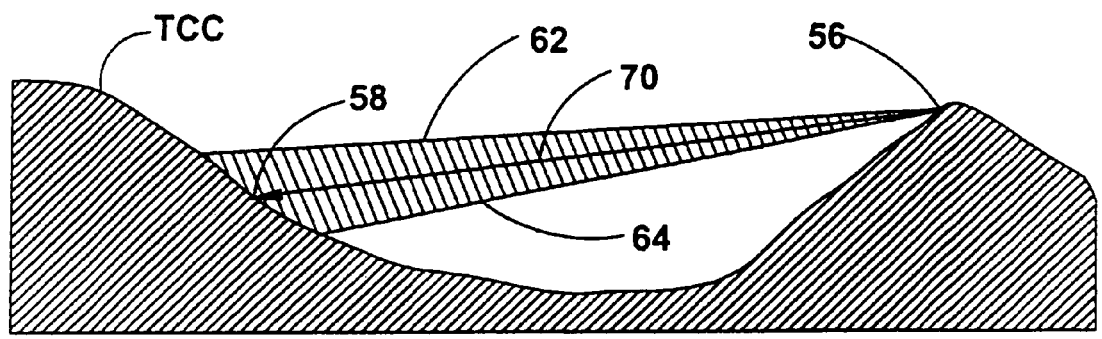
FIG. 4C is a schematic description of the imaginary envelope shown as a cone surrounding the sighting vector, demarking measurement imprecision associated with the system.

The measurement imprecisions associated with the data acquisition modules are contained within the volume of a virtual envelope surrounding the vector v. In the Figs., the envelope is illustrated as a solid cone for the sake of simplifying the description. FIG. 4C is a side elevation of a cross-section cut in a vertical plane through the DTM surface contour, through the LOS, and thus through the cone. The smaller the errors introduced by the data acquisition modules, the sharper the vertex angle of the cone, thus the closer the mantle of the cone to the LOS. As seen in FIG. 4C, the cone is drawn in symmetry around the vector 70, or LOS, which it envelopes. Vector 70 joins between the origin O, marked as the observation position 56 supporting the vertex of the cone, and the target T designated as point 58. From the observation position 56, here the origin O of the system of coordinates of the DTM, the vector 70 points to target 58. Lines 62 and line 64 mark the, respectively, upper and lower generatrix of the cone cross-section. The envelope depicted as a cone in the Figs., intends to represent a volume contained between the lines 62 and 64. The lines 62 and 64 reside in the cone mantle, or envelope mantle, enclosing the envelope.

To locate the target, an iterative calculation process is applied, employing two pointers implemented concomitantly. A first pointer moves on the DTM, hence along the curve of the terrain surface contour itself, which is the vertical projection of the vector 70, in the vertical azimuth plane on the DTM. The first pointer starts from the projection of the origin O on the DTM, and proceeds in the direction of the measured azimuth. A second pointer moves along the vector 70. Both pointers are collinear on the vertical through the first pointer. After a number of iteration steps, both pointers meet, at the intersection of the vector 70 and of the DTM terrain contour curve, then the target T is found. This is further explained in FIG. 5 to which reference is now made.

Instead of using pointers, or an iterative intersection finding process, any other method for that same purpose is practical. For example, an entirely analytical solution may be applied when the DTM surface is defined analytically, but any other suitable approximation method is also useful.

Figure 5:
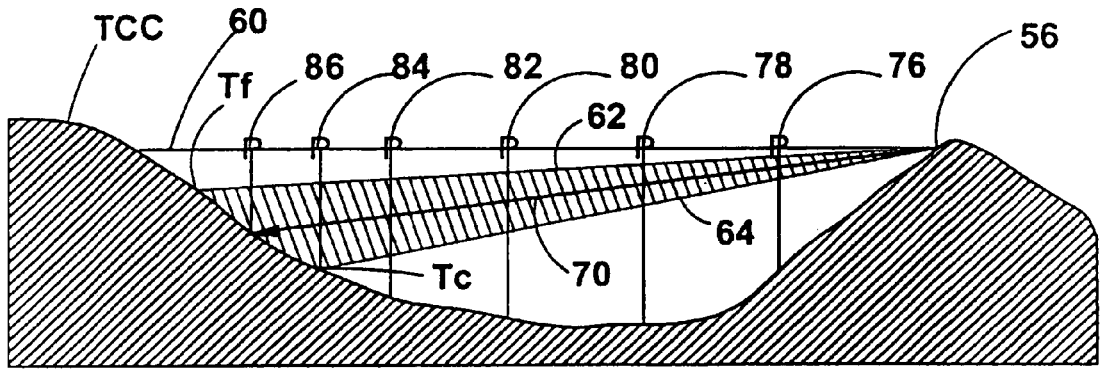
FIG. 5 is a schematic description of the geometric basis for searching intersection points as defined with the PTAS.

In FIG. 5 an imaginary point P is moved in successive iteration steps on the horizontal 60, which is oriented in the direction of the azimuth and vertically coplanar therewith. At each iteration step, a normal to the horizontal 60 passing through point P, intersects both the vector 70 and the DTM, or the terrain contour curve TCC. The first pointer Pv, not marked on FIG. 5, designates the intersection of the normal to the horizontal 60 with the vector 70, and the second pointer Pd, not indicated on FIG. 5, indicates the intersection of the normal through point P with the DTM terrain contour curve TCC of the DTM. In a first iteration step, point P is moved to location 76 on the horizontal 60. Since the vector 70 is above the DTM terrain contour curve, both pointers Pv and Pd do not meet, as they are separated by a distance along the vertical Z-axis of the DTM. The fact that both pointers Pv and Pd do not coincide, or do not match, means that the target T has not been detected. Therefore, the iteration process continues.

In a next iteration step, point P on the horizontal 60 moves from position 76 to position 78. Accordingly, Pv on vector 70, and Pd on the DTM terrain contour curve TCC, progress to a new location. Both pointers reside on the normal to the horizontal 60 through position 78. Still, no match is found, since both pointers Pv and Pd are mutually separated in vertical distance on their common normal. Likewise, a further iteration step of point P from position 78 to position 80 has the same result, since Pv and Pd do still not match. The iteration process continues in the same manner in further steps, from position 80 to position 86. The target T on vector 70 is finally found at position 86 where both Pv and Pd coincide. However, this target point is theoretical, since due to system errors, the real target may reside anywhere in an error-area circumscribed by the intersection of the cone mantle with the DTM, actually the terrain surface contour. This error-area is delimited by a target area border formed by the intersection of the mantle of the cone, or by each directrix of that mantle, with the DTM.

The horizontal 60 is used for the sake of explanation only. In fact, the pointer Pd is displaced iteratively, and the pointer Pv follows accordingly on the same vertical. The iteration steps are set to ascertain small and reasonable consecutive jumps along the DTM, thus along the terrain surface contour curve TCC of the cross-section, say in steps of each 10 cm, or as desired.

Still with reference to FIG. 5, at position 84, the lower directrix of the cone mantle, represented as line 64, will provide the target point Tc closest to the observation position 56 on the target border. The farthest target point Tf resides on line 62, which is the highest directrix of the cone. Other points on the target area border are determined by iteratively continuing the pointer-match searching process described above, for other directrix lines of the mantle of the cone. It is understood that the smaller the system errors, the smaller the error-area. Should the terrain contour be a geometric plane, then the error-area would become a geometrical cone section, thus an ellipse for a plane slant to the LOS, or vector 70.

Figure 6A:
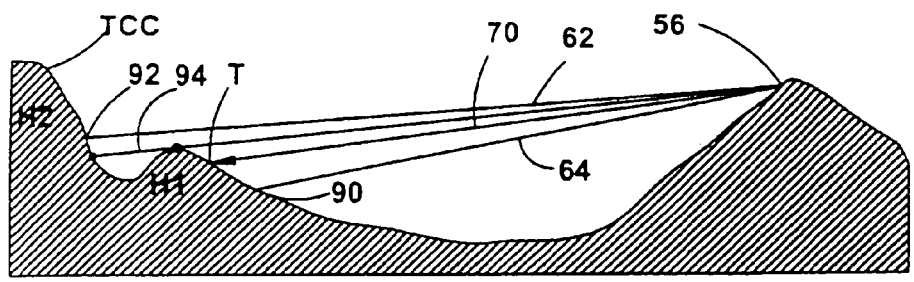
FIG. 6A is a side elevation showing two error zones.
Figure 6B:
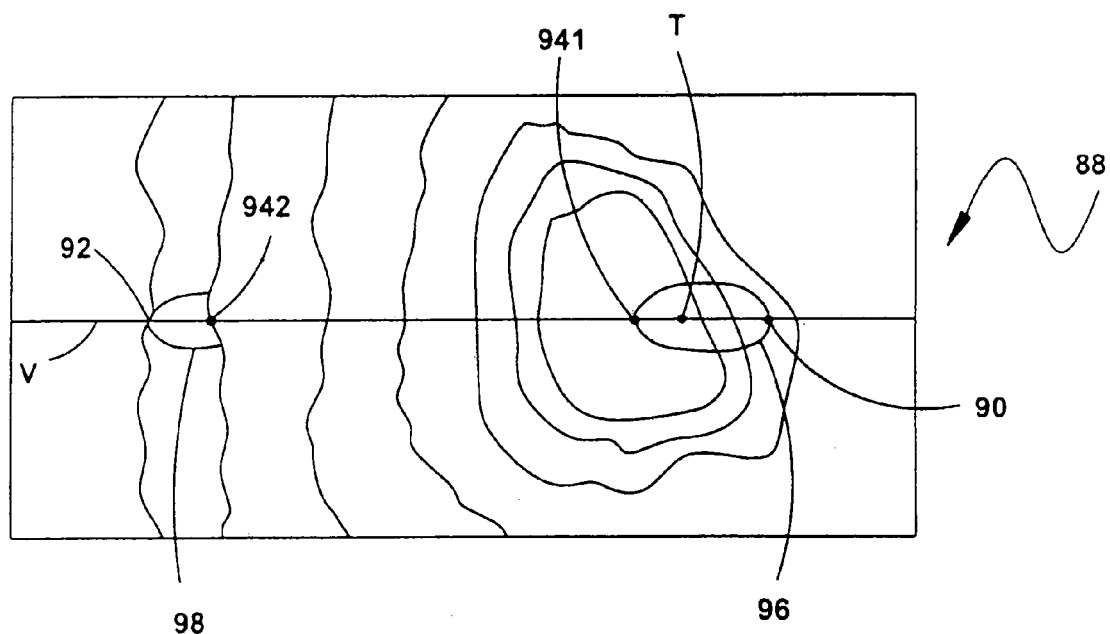
FIG. 6B is an illustration of a display showing two error zones.

In reality, the error-area is displayed to an operator on the display module in the shape of a trace, or a closed curve defining the uncertainty area wherein the target resides. However, depending on the convolutions of the DTM surface contour and of the angle of incidence of the LOS thereon, more than one closed curve may define the uncertainty area for a single target sighting. With reference to FIG. 6A, there is shown a cross-section cutting the DTM terrain surface and the cone in a vertical plane through the vector 70. The terrain contour curve TCC of the DTM terrain surface represents a meandering hilly curve with peaks and valleys. As shown in FIGS. 6A and 6B, the vector 70 will hit the first hill H1 to indicate a target T thereon, while the lower and the upper generatrices, respectively 64 and 62, intersects the terrain contour curve TCC at point, respectively 90 and 92. Point 90 and point 92 reside on, respectively, the forefront first hill H1 and a background second hill H2. The vector 94 is asymptotic to the top of hill H1 at point 941 and hits hill H2 at point 942. The area of uncertainty as defined by the cone will delimit a first error-area 96 on that first hill H1, up to the top thereof, and also a second error-area 98 on the second hill H2.

It is taken for granted in the description below that reference to displayed information, such as the display of error-area(s) refers to both graphical and numerical data, and likewise to associated information related thereto, and that the operator may select to view both or only either graphical or numerical data. To receive data relative to any point selected on the display, the operator uses the I/O unit accepted as being available as standard equipment with sighting devices.

Still with reference to FIGS. 6A and 6B, it is thus possible to passively sight a single target and to obtain in response more than one uncertainty area. In such case, a plurality of separate uncertainty areas is displayed to the operator on the display module, all as traces or closed curves aligned along the direction of the vector v, or LOS. The topography of the DTM shown in FIG. 6A is depicted as a top elevation in FIG. 6B, which represents the display 88 as appearing to the operator. The target T is indicated on hill H1 but the uncertainty area covers a first patch 96 on that hill, and a second patch 98 on hill H2. FIG. 6B illustrates more than one mutually separated uncertainty area, which is indicative of a "dead zone" between each couple of uncertainty areas. Although not shown in the various Figs., numerical data, or associated information related to the graphical information is also shown to the operator. It is taken for granted in the description that reference to a display, or presentation on display, refers to both graphical and numerical data, or associated information related thereto, and that the operator may select to view both or only either graphical or numerical data.

A dead zone is defined as a region of terrain hidden from the view of an operator when sighting the target along the LOS. It is to the operator to decide in which uncertainty area the target may reside. The existence of a dead zone is considered as valuable information unveiling the presence of hidden areas. For the benefit of the operator, the PTAS differentiates between a cone mantle intersection delimiting an error-zone and a vector v intersection indicating the target, and emphasizes this distinction on display.

Returning now to system inaccuracies, it is realized that the measurement imprecisions in elevation and in azimuth are different in value, thus bound by an envelope in the shape of a four-sided pyramid. A section therethrough, normal to the LOS, will rather show as a rectangle and not as a circular base, in the case of a straight cone as used for ease of description. In fact, the term envelope is used as a generic name for a three-dimensional shape with an apex at the observation position, possibly divergent toward the target, but proportional to measurement inaccuracy, and enveloping the LOS along its length. For example, a four-sided pyramid, not necessarily square, may typify inaccuracy in azimuth and in elevation. In reality, for the general case of an envelope, a cross section perpendicular to the LOS vector will provide a shape enclosed within borders. These borders represent the mantle, or exterior surface of the envelope. Each point on the cross-section is better defined in polar coordinates. With the origin on the LOS vector, a radius vector and an angle define each single point on the cross-section of the envelope.

The iterative target search process is not ended when a first target is reached, but is set to continue along the same vector v and cone mantle directrices, until a vector length end is reached. This vector length is set a priory by the operator, for example, as 10 km.

In practice, not only the intersection points with the DTM are valuable, but also the surface they delimit, as well as the distance between the delimited surfaces. The first created intersection point is that of the vector v piercing the DTM, and designating a target point. When the contour of the DTM presents a succession of aligned hills along the vector v, then, vector v may intersect the DTM at more than one single point. One of those intersection points is the target. Other intersection points with the DTM are those of the mantle of the envelope, which intersection points delimit an uncertainty area. Each intersection point of the vector v with the DTM is accompanied by an uncertainty area, one of which surrounds the target. There is thus always one target, but possibly more than one uncertainty zone. It is the separation between the uncertainty areas, thus the distance between the delimited surfaces that indicate the presence of dead zones. The detection of dead zones is very often of cardinal importance, for example in rescue operations, in civil engineering, and in warfare.

Figure 7:
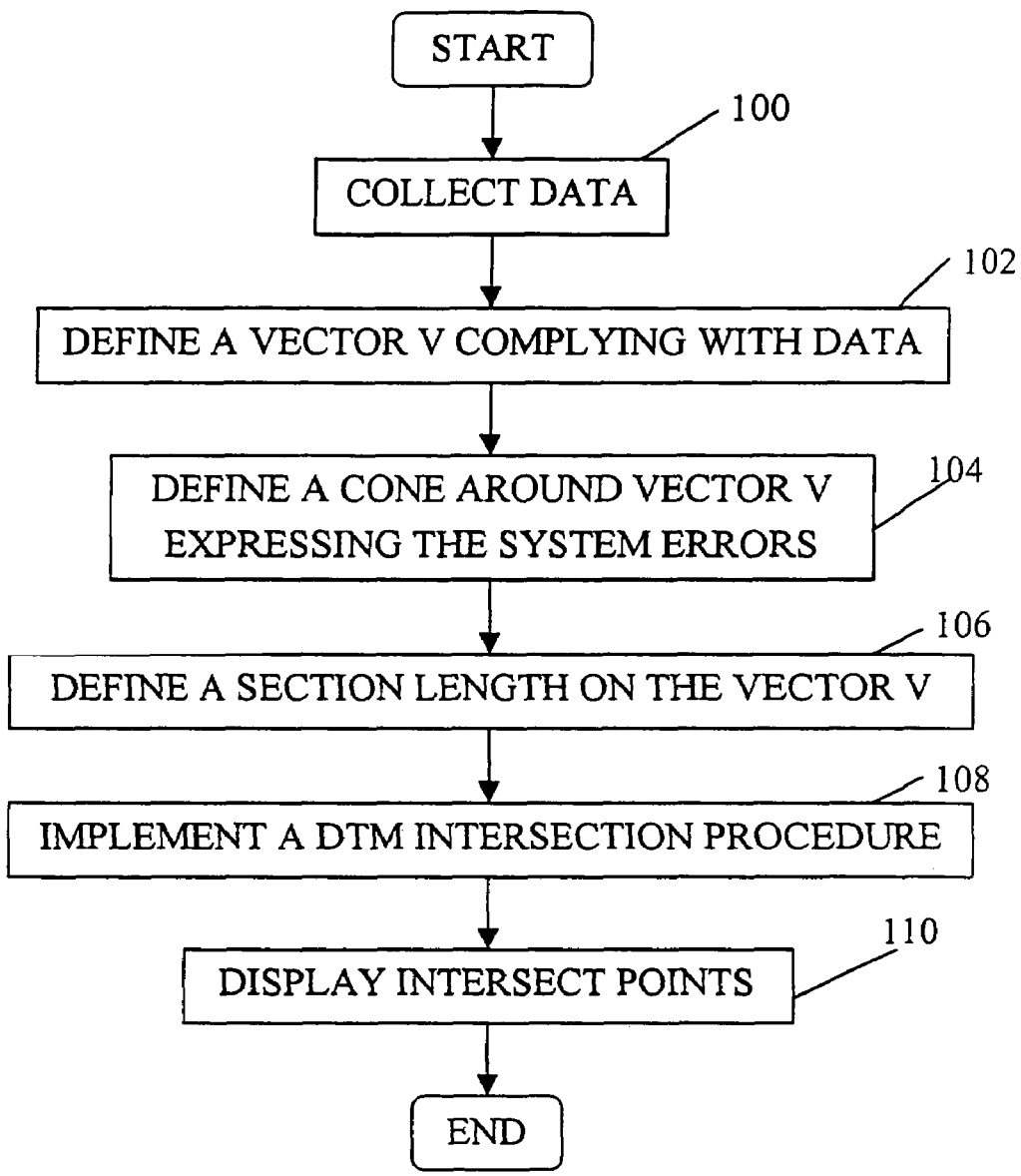
FIG. 7 is a flow diagram of the succession of steps by which the passive target data acquisition of the invention is performed.

The entire process of passive target acquisition in accordance with the present invention is described schematically in FIG. 7 to which reference is now made. In step 100 data is collected, including azimuth and elevation angle to the target, and position of the observation position on the DTM. Reference to an observation position located above the DTM, such as for an airborne platform, is made below. At step 102 a vector v is defined as having an origin at the observation position and a direction as defined by the azimuth and elevation angle. At step 104 a cone, for the sake of simplicity, is defined having a vertex at the observation position, and a vertex angle corresponding to the errors of the system, in relation to the data acquisition modules. At step 106 the operator defines a maximal section length on the vector v to be searched for intersection with the DTM. The maximal section length is defined once only, at the beginning of the setup, for example, as 10 km long. At step 108 the iterative DTM intersection finding procedure is implemented. The intersection points, LOS vector point and cone mantle points are found and displayed on the display module, for inspection by the operator, in step 110.

Figure 8:
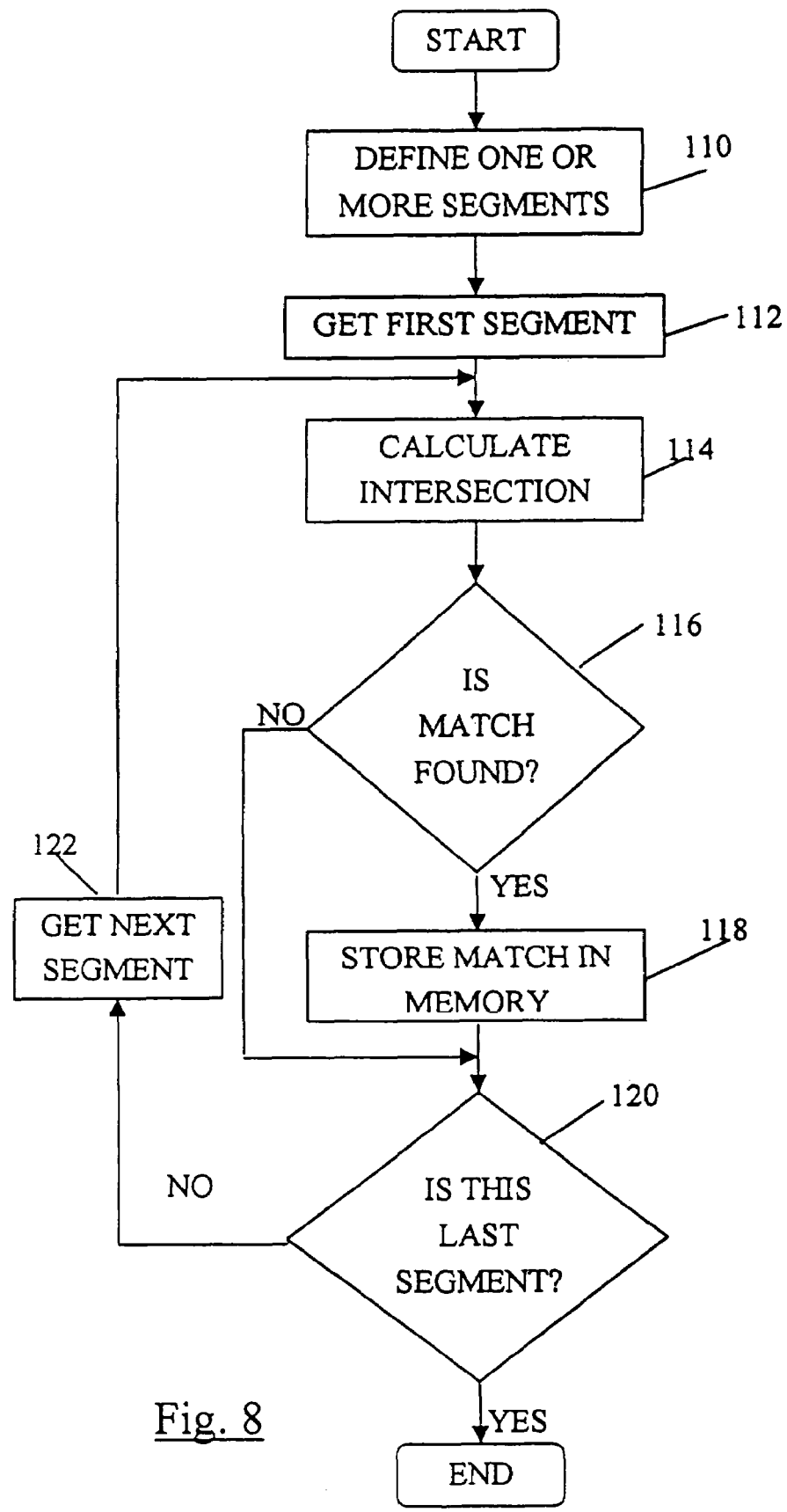
FIG. 8 is a flow diagram of the DTM surface intersection procedure.

The DTM intersection procedure is described schematically in FIG. 8 to which reference is now made. In step 110 the allocated section is divided into segments. The first segment is selected in step 112. If desired, there is only but one single segment. Next, in step 114, intersection calculations are performed on the first segment, to find matches, or coincidences between the pointers on the vector line and on the generatrix of the cone envelope relative to the pointer on the DTM. Then, in step 116, the system tests for the finding of at least one match between pointers. If not found, control passes to step 120. If a match is found, then, by step 118, the at least one match point is stored in memory and control flows to step 120. Should this be the last segment, or the only single segment, then the procedure is ended. Else, in step 122 a next segment is fetched. Control returns to step 114, and calculations are carried out for the next segment in search for a possible match between both pointers. If desired, the whole predetermined length of vector v is considered as one single segment. In other words, the first and only segment is the maximal section length on the vector v to be searched for intersection with the DTM. This approach has its advantages.

It is understood that coincidence or match of the pointers Pd and Pv is accepted to exist when their mutual vertical distance lies between preset tolerances. For example, even when a few centimeters still separate between both pointers, such a small discrepancy may be considered as a coincidence of pointers, thus as achieving a valid match of pointers.

In general, when reference is made below to a match or coincidence, there is considered a range of tolerance, since in real life there is no advantage to require perfect mathematical exactitude.

The PTAS computer program is also a powerful tool enabling to discover and map dead zones of terrain while in the planning stage of a mission, well before actual execution. To this end the computer program of the PTAS is fed with data related to a selected region to be scanned, and run to display the results. An operator may enter a waypoint of a planned observation position, define a LOS vector length, and then select a region to be searched by defining the azimuth and elevation angles as parameters. As a most simple example, when a single azimuth and a single elevation angle are entered, then dead zones along only that LOS vector are calculated and displayed. To obtain information about a longitudinal section through the terrain along one vertical azimuth plane, the same calculations are repeated but for a succession of elevation angles within given limits. To cover an area of terrain, both azimuth and elevation parameters are entered as variables, within a chosen range of angles. Other combinations of observation point position, LOS vector length, elevation, and azimuth angle will serves numerous additional purposes.

The observation position from which the PTAS is operated is not necessarily a static position, but if desired, is possibly a mobile position. The PTAS is preferably mounted on a stabilized platform when implemented as a device operated on a vehicle in motion. In general, the PTAS is compatible for use on a platform, static or mobile, on land, at sea, in the air or in space. When built according to present art practice, and when integrated with existing systems, the PTAS is not larger than a small handheld camera, which renders it practical for assembly with handheld personal binoculars and weapons, and with unmanned airborne vehicles.

When operated from a mobile platform, such as from an unmanned airborne vehicle, additional data input and computer programs are necessary to take into account the path or trajectory of the platform, and the spatial attitude movements of the platform.

North Finding Procedure (NFP)

The capabilities of the PTAS and the implementation of the Target Data Acquisition Process, or TAP, may be used for an additional purpose. In a linked process, a rapid north-finding procedure (NFP) is implemented by using the PTAS described hereinabove in association with an active range finder, typically a laser range finder LRF. The system is used for perfecting a rough north measurement, such as obtained by a magnetic compass, to an enhanced high-precision north indication. The NFP uses sightings to reference targets RT, associating both passively calculated range and actively measured range to compute a common angular correction factor, and rapidly obtain an accurate north reading at the site of the observation position.

Figure 9:
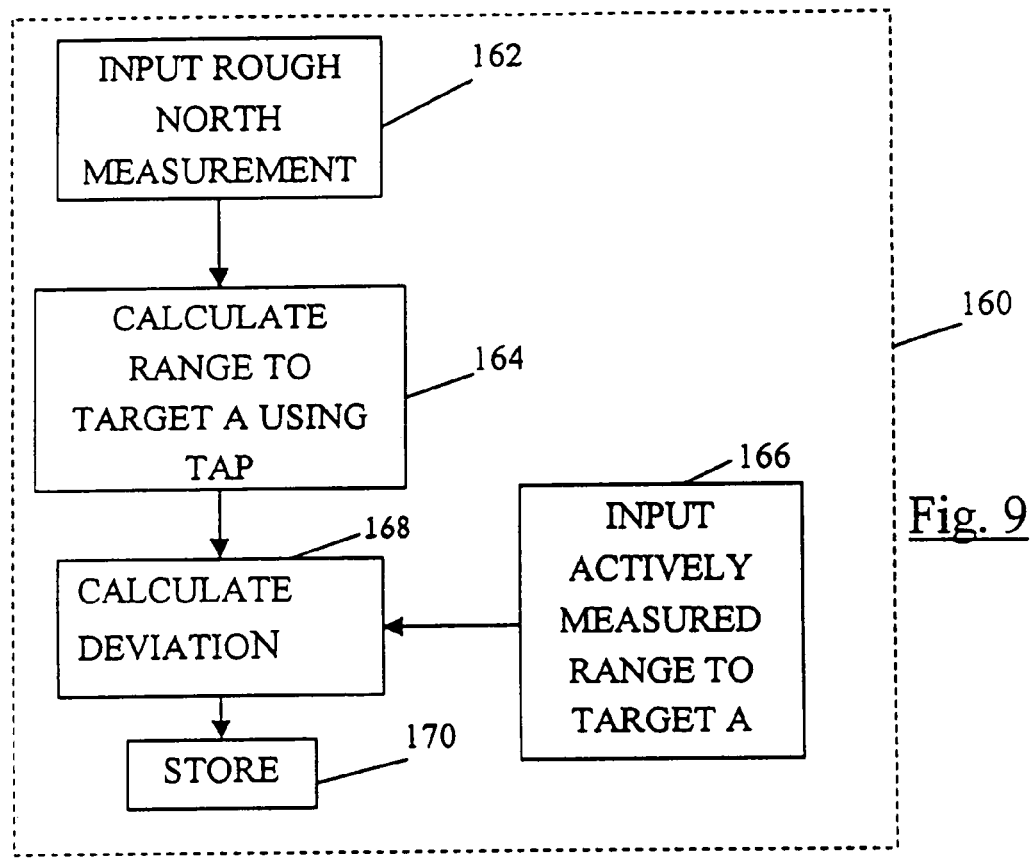
FIG. 9 illustrates a procedure for defining an accurate north procedure.

To begin with, the NFP uses a data input procedure (DIP) as explained below, with reference to FIG. 9. The DIP 160 accepts the input of a rough north measurement at step 162. The target data acquisition process, or TAP, is then operated to calculate the range, or the distance to a reference target A as defined by the operator in step 164. At step 166 the DIP accepts the input of an actively measured range to the reference target A, as measured by help of a laser range finder LRF. At step 168, the deviation between the range calculated by the TAP and the range measured by the LRF is used to calculate a common azimuth correction factor. To that end, an observation zone sector is defined and divided in sub-sectors. Selected sub-sectors are scanned to detect a match between the calculated and the actively measured range to a reference target A, or RT A. As explained below in detail, for each range-match found, the TAP calculates the angular deviation separating the azimuth to the RT A and the azimuth to a location with a matching range. The derived angular deviation is stored in step 170. The DIP is repeated several times for different selected reference targets A chosen in different predetermined sub-sectors. However, the NFP operates well even with a single RT A.

Figure 10:
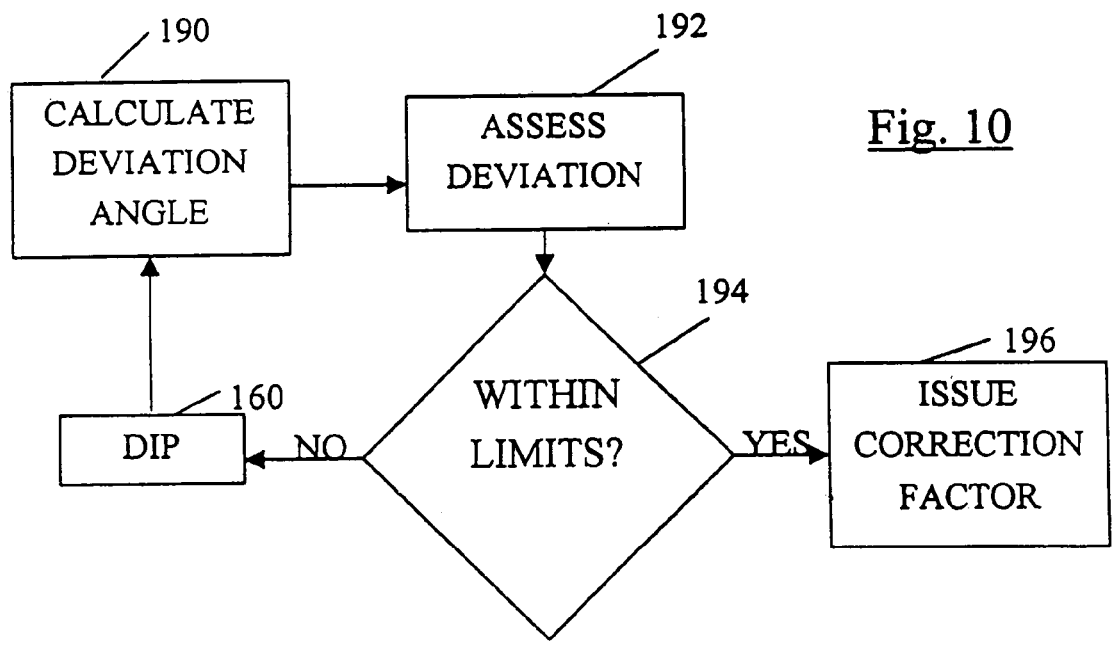
FIG. 10 presents steps for assessing deviations with respect to selected reference targets.

In the procedure described in FIG. 10 to which reference is now made, a common deviations factor for the several selected reference targets A is calculated in step 190. Once collected, the deviations are assessed in step 192. This is accomplished for example by defining a permitted tolerance, and declaring a match to be valid when the ranges are within tolerance limits, as in step 194. It was already stated above that matching or coinciding relate to a practical predetermined range of tolerances, and is not mathematically absolute.

If the calculated common deviation factor is found and is within tolerances, then a correction factor is produced to establish the accurate north, in step 196. Should a common deviation factor not be found, then the DIP is reactivated and operated on a new set of reference targets chosen in differently predetermined but not adjacent sub-sectors.

Figure 11:
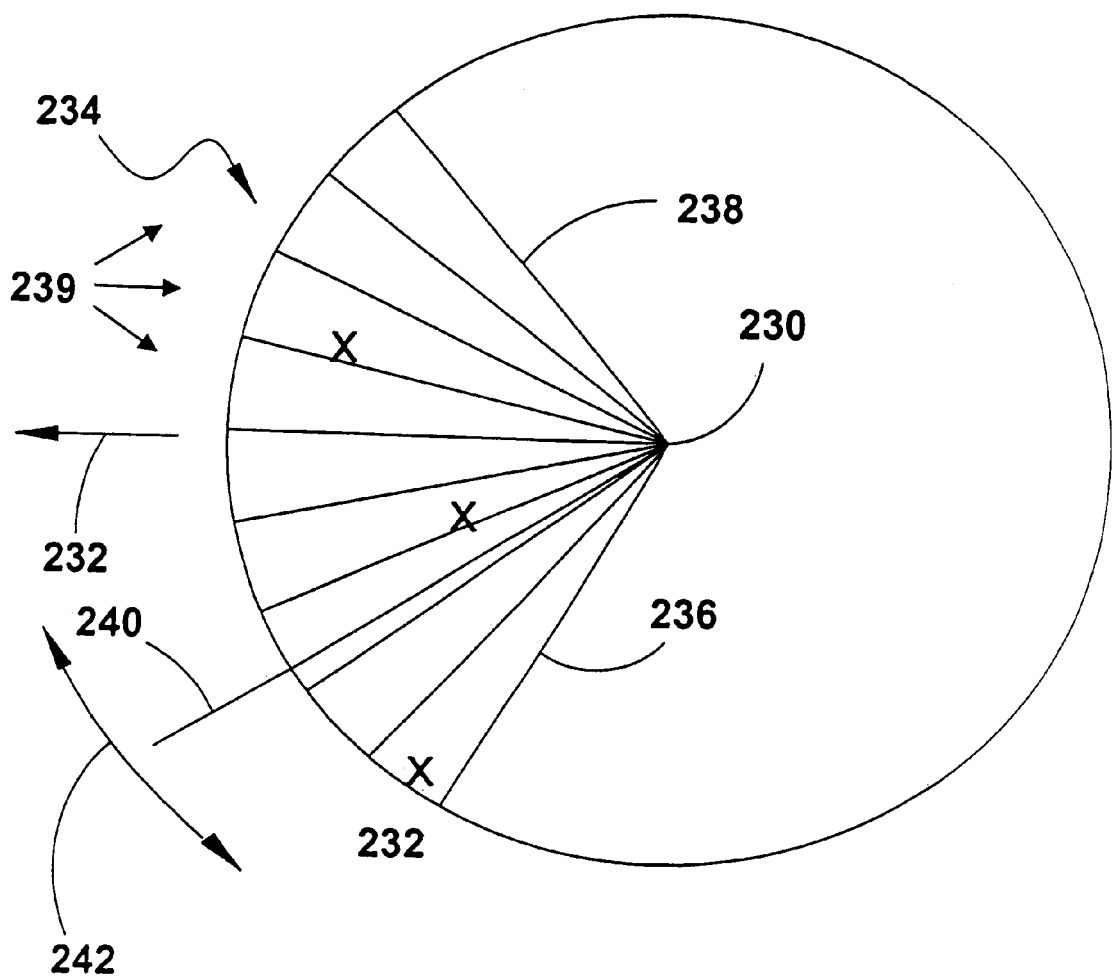
FIG. 11 depicts a scenario for reference target selection.

The system of the invention searches the DTM and selects the optimal reference targets so as to achieve the best possible accuracy enhancement. The overall scenario of reference target selection is described according to FIG. 11 to which reference is now made. The PTAS observation facility at position 230 looks roughly in the direction of arrow 232. The area of interest is assigned an observation zone sector 234 having two radii as zone limits, 236 and 238, respectively. Then, the observation zone sector is divided into several sub-sectors 239, typically 10, by a procedure possibly carried out automatically by the computer module of the TAS, or by the operator. Within each sub-sector 239, the DTM is searched for one singular reference target (RT), each being defined as a locus. Such a locus is a site where each small angular movement of a radial cursor 240, in sector 234, in the direction transverse to the azimuth, as depicted by the double-headed arrow 242, encounters large changes in range. Typically, the sub-sectors 239 in which a RTs are selected are spaced apart and not adjacent, as highlighted by the X marks within the sector 234. When desired, the NFP is operated with only one singular reference target RT, although usually three RTs in non-adjacent sub-sectors 239 are preferred.

To operate the NFP, there is needed a PTAS as described above, an NFP computer program running on the computer module, and an active range measurement device such as a LRF. It was described above that the PTAS is operative independently, but this is not true for the NFP, which requires the support of the PTAS to function.

Figure 12:
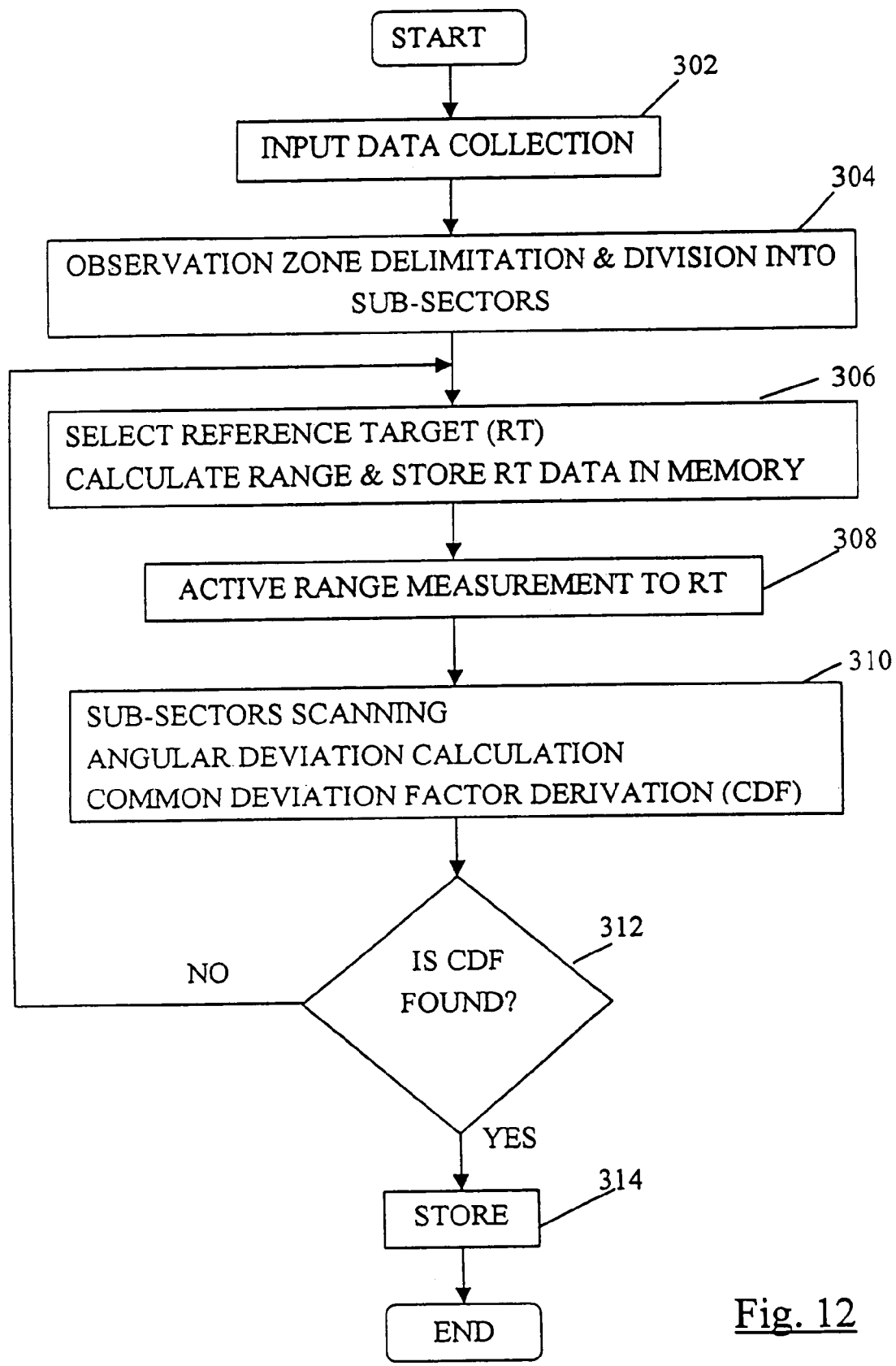
FIG. 12 is a detailed flow diagram of an accurate north finding procedure.

With reference to FIG. 12, input data is collected in step 302, including the position of the observation position, and the azimuth. Typically, those input data are obtained as follows. For the location of the observation position, which is regarded as the origin of the Cartesian set of coordinates on the DTM, a GPS (Global Positioning System) device is practical. As to the azimuth, a compass or a similar device provides the necessary indication, to a rough but sufficient accuracy of some ±10 mills. Optionally, input is received from other sources.

Then, in step 304, it is to the operator to delimit the observation zone sector on the DTM, as described above with reference to FIG. 11. Should the operator not do so, then the NFP will automatically set a default observation zone sector to 360°. Delimitation of the sector is achieved by defining a sector radius, as the maximal observation distance, and by setting radial limits. The operator, or the computer module, will divide the observation zone sector 234 into sub-sectors 239 typically ten.

In step 306, the computer program of the NFP now searches the DTM to select a singular reference target RT in say three non-adjacent sub-sectors. Such a singular RT is a locus typified by a sharp change in range for a small angular deviation in azimuth. The PTAS now calculates RT data for each singular RT, i.e. the calculated range, elevation, and azimuth, which RT calculated data is stored in memory. More precisely, the PTAS calculates data for RTs in each sub-sector 239 and stores that data in memory. Then, in step 306, three sub-sectors are chosen at random, and one RT is selected in each one of the tree sub-sectors.

In turn, in step 308, the range to each RT is now measured, this time actively with an LRF, and stored in memory in association with the respective RT. LRF measurement is taken by sequentially pointing the sighting device at each RT. However, the operator is not aware of the location of any RT on the real life terrain as seen from the observation position, and thus needs guidance, which is possibly provided in at least two different manners. The azimuth and elevation needed to point the LRF toward the RT, which were derived in step 306, are now put to use to guide the operator. As a first manner, arrows on the display are pointing toward the required direction of sighting to guide the operator who will train the instrument until a feedback signal indicates "on target". At that point, the operator will "fire" the LRF and obtain a range. This sequence is repeated for each RT. A second manner exploits drive gears integral to the sighting device to take care of automatically sighting the instrument, and positioning the crosshairs on the RT, and then, when "on target", signal to the operator to actively measure the range. Alternatively, active range measurement is performed automatically. Again, this sequence is repeated for each RT. Each LRF reading is stored in association with the respective RT.

The guidance given to the operator for pointing to the RT as calculated by the PTAS with respect to the inaccurate azimuth indication will result in a specific accurate LRF range measurement. However, since the azimuth is not accurate, the LRF measurement, although accurate, will not relate to the RT but to another location, in a close-by direction.

Up to now, the NFP has stored passively calculated as well as actively measured ranges to RTs, as based on a rough north indication, which is certainly not the accurate precise north direction. Most probably, the passively calculated range and the actively measured range will provide different values. This discrepancy results from the fact that the computer program regards the azimuth as an absolute precise one, while in reality this is but a rough and inaccurate azimuth, which was measured with say, the help of a compass.

It is now the task of the computer module of the PTAS to find out by how much the LRF reading missed the RT by angularly adjusting the discrepancy of the coarsely measured azimuth with the accurate north. If advantageous to reduce the value of the angular discrepancy, the origin of the coordinates on the DTM may be relocated within limits.

In step 310, the NFP operates the PTAS to scan the sub-sector 239 containing a selected reference target RT, through a typical angle of inaccuracy of some ±10 mills, which is the angle of inaccuracy of the compass. The scan is conducted transversely to the direction of each computed RT. What the NFP is searching is to discover the angular deviation between a calculated point on the DTM surface, which has the same range readings as that of the LFR. Thus, when a match is found where the actively measured range to a RT coincides with a point in the respective sub-sector 239 on the DTM, the angular deviation between the azimuths to the RT as actively sighted and as calculated is saved in memory. More precisely, it is the angle between the azimuth of a point on the DTM surface, which has the same range as the one actively measured by the LRF, and the original coarsely read azimuth to the RT that is calculated by the PTAS. Then, the NFP will repeat this operation for each RT and at the end, try to find a common azimuth deviation factor, or CDF. When applied in succession to each RT, the CDF will provide a common correction factor by which the coarse azimuth indication has to be adjusted to indicate the accurate north direction.

In step 310 the transverse scan operation is repeated for each RT in the three separated non-adjacent sub-sectors. A CDF is searched for in step 312, and if found, it is stored, as by step 314, and used for adjustment.

If desired, to obtain better accuracy, after derivation of a CDF, the NFP also may also check whether corrections, within predetermined limits, of the input data regarding the observation position location, will help to obtain a reduced CDF value. Should this be the case, then the location of the observation position is also corrected. This last optional step is not detailed in FIG. 12.

Once a CDF is found, the NFP then comes to an end. As described above, matching is accepted as such within predetermined tolerances.

Should a CDF not be found in step 312, then control return to step 306, where another different set of three separated non-adjacent sub-sectors is selected, and an RT is chosen in each sub-sector. In the field, the NFP usually determines a CDF in a single search loop, but two or more CDF calculation loops are possible for difficult conditions.

True Azimuth Finding

In general, following the description hereinabove, one may consider the concept of a method and of a system wherein a search zone is displayed to an operator who has to search for and find a location disposed within the interior of the search zone. The concept is advantageous for application to a plurality of embodiments permitting to obtain a true azimuth heading, to derive therefrom the true North, and in particular cases, to obtain position location data.

Figure 13:
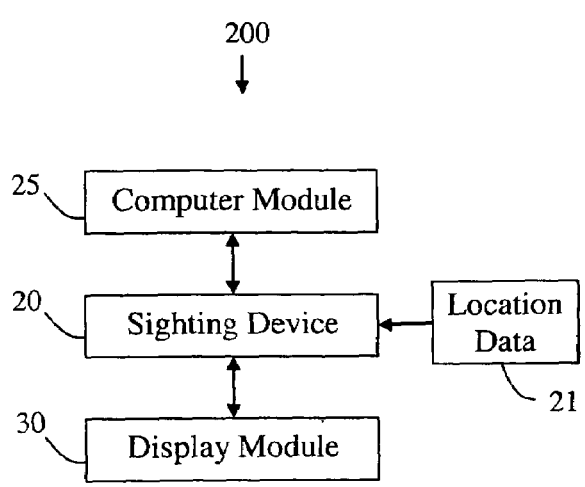
FIG. 13 shows a block diagram of the data acquisition system 200.

The data acquisition system 200 may be regarded as including at least a computer module, a sighting device and a display. FIG. 13 is a block diagram of the data acquisition system 200, showing the computer module 20 to which are coupled in bi-directional communication, both a sighting device 25, and a display module 30. The display module 30 is coupled to the computer module 20. In addition, the computer module 20 has access to a source of location data 21.

The computer module 20 has at least a memory for storing computer programs and maps in digital format, and a CPU for reading and for running digital format computer programs and maps. The memory and the CPU are not shown in the Figs. for the sake of simplicity.

The sighting device 25, or sighting means, well known in the art under various names, are first leveled, physically or digitally, and then operated to aim one or more optical devices to a sighted target and measure angles such as pitch and yaw angles, elevation angles and azimuth headings, and even measure range. Pitch and yaw angles are measured for example with an encoder or with a vernier on a scale. Elevation angles, both above and below the horizontal, are measured for example with an inclinometer.

The display module 30 is a computer display, or a touch screen, for input and output of data. It is on the display module 30 that the operator will have to search and find the specific sighted target SST displayed in superimposition to a map of some type, and to obtain therefrom the accurate azimuth to the specific sighted target SST.

This search-and-find process is operated either manually or automatically. Probably, the specific sighted target SST will be found on the display near the coarsely calculated target CCT. To ease the search, a search zone is built and displayed according to the system's inaccuracies. The creation of a search zone includes, for example, the two steps of first determining the position of the coarsely calculated target CCT, and second, the calculation of the limits of the search zone.

Figure 14:
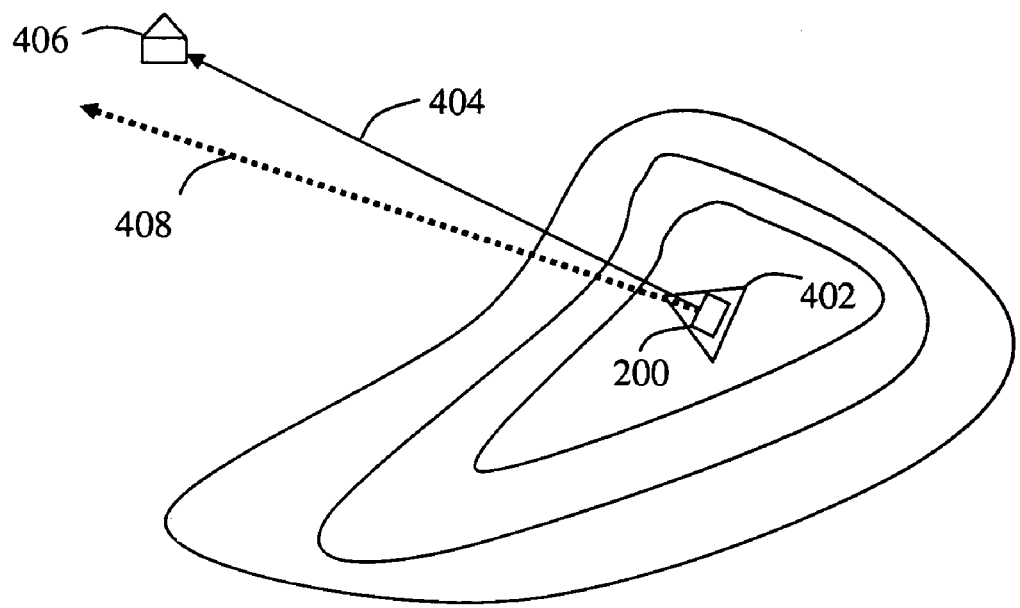
FIG. 14 illustrates a line of sight and a coarse azimuth direction originating from an observation position.
Figure 15:
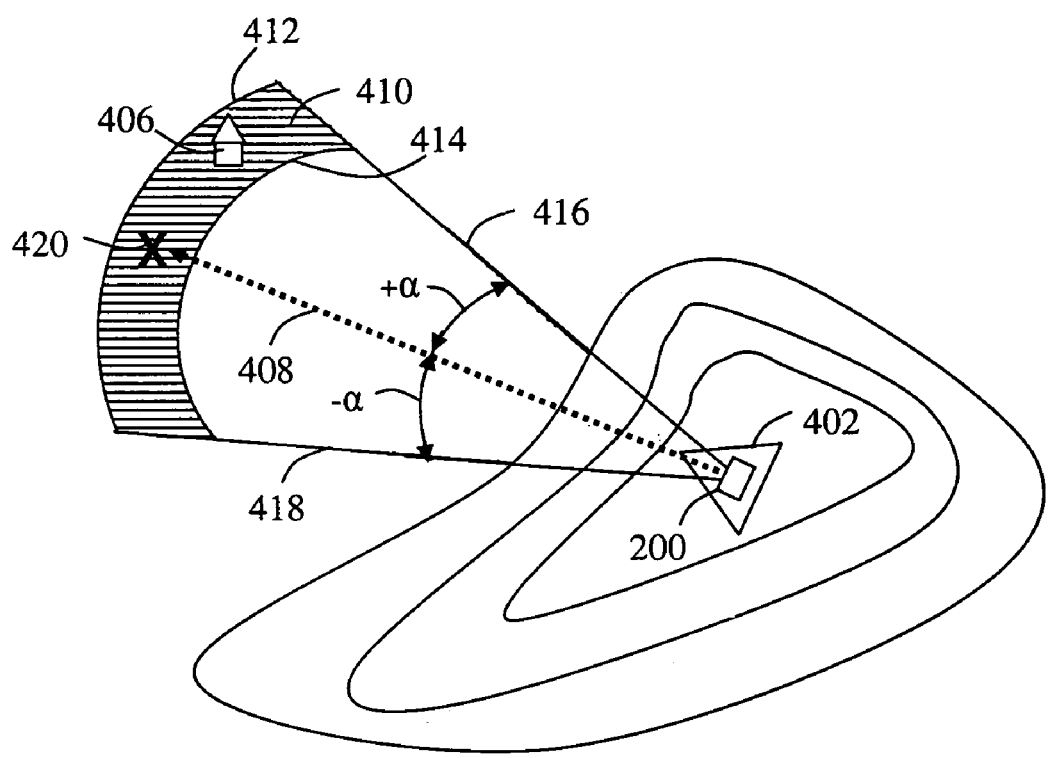
FIG. 15 depicts a search zone containing a selected sighted target.

FIGS. 14 and 15 are of help to describe the sighting of a target and the concept of an error area which is displayed as a search zone.

FIG. 14 shows an observation position 402 with a data acquisition system 200, wherefrom an observer or operator directs a line of sight LOS indicated as 404, toward a selected sighted target SST designated as 406. A dotted line 408 shows the orientation of a coarse azimuth direction measured by the operator toward the SST as part of the target data measurements. Evidently, those target measurements include inherent measurement errors possibly depicted as an error area that is presented to the operator on the display module 30 as a search zone.

In FIG. 15 an error area 410 containing the selected sighted target 406 is illustrated as being delimited by two arcs 412 and 414, and by two radii 416 and 418. Both arcs 412 and 414 refer respectively, to the highest and the lowest range error limit. The length of both arcs, which span the angular error limits of the coarse azimuth readings, is evidently the longer the greater the distance away from the observation position 402. The two radii 416 and 418 define an angle ±a according to the maximal error limits of the coarse azimuth measuring means, on both sides of the dotted line 408, which is the coarse azimuth direction, toward the coarsely calculated target CCT, designated as 420.

In FIG. 15 the radial distance between the proximal arc 414 and the distal arc 412 represents the range measurement errors. For example if a Laser Range Finder LRF is used to obtain range data, then the distance separating the proximal arc 414 from the distal arc 412 is defined as the maximum to minimum measurement error of the LRF, typically ranging from 5 to 10 meters.

When the range is derived from a map and no error range is entered, then the error zone is restricted to an arc of a circle and the selected sighted target 406 will be found adjacent that arc. In this case both the proximal arc 414 and the distal arc 412 arc coincide. Optionally, a default value is entered for the range error.

Figure 18:
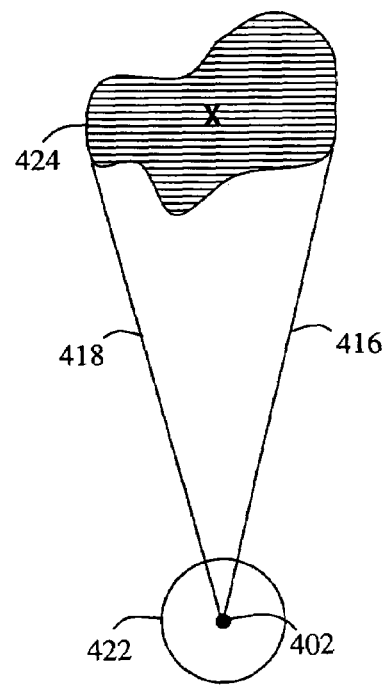

Should the range error include dynamic errors, which depend on elevation errors, or range errors that vary in relation to different azimuth directions within the error area, then the shape of the error area may become asymmetric, as depicted in FIG. 18.

In general, at the end of the data acquisition process, a search zone 410 is displayed and delimited, and the selected sighted target 406 will be found therein, within the contour of the measurement error limits. It is now to the operator to locate the selected sighted target 406 in the search zone 410, which is an extremely small and confined area.

It is taken for granted that an active range-measuring device emits radiation, such as for example a laser range finder or LRF. In contrast, an inactive range-measuring device or range data source does not emit radiation or signals. It is understood that the word "inactive" is used in contrast with the word "active", which is regarded as being descriptive of radiation emitting means. Inactive range acquisition means may include passive range acquisition devices, such as for example the PTAS method and system, optical means, computer programs, but also available maps, documents, pictures, and listings. The range measurements are considered accurate when derived from a map or a listing. When measured with a laser range finder LRF, the measurements are still considered as being accurate even though the accuracy is usually limited to about 5 to 10 meters.

Means for deriving range data may include the sighting device, a dedicated computer program, maps and listings, wherein maps are selected alone and in combination from the group of maps consisting of digital terrain maps, ortho-photo maps, aerial photographs, space photographs, tactical maps, infrared maps, radar maps and geographical maps. Range data are derived as a distance derived from an active range measurement device and with an inactive range data source.

The various range acquisition means, or range data sources, are possibly used as desired, alone and in combination. However, when using the stellar system as reference, the use of active range measuring devices is not practical.

A first embodiment 1000 of a data acquisition system 200 is now described. The first embodiment 1000 is configured to obtain a true azimuth heading in correction of a coarsely measured azimuth heading.

In FIG. 14, the coarse azimuth heading 408 is measured from the observation position 402, where the data acquisition system 200 is disposed, to a specific selected target 406.

The data acquisition system 200 has a computer module 20 running at least one computer program, including dedicated computer programs, such as the PTAS computer program, stellar computer programs and various types of maps in digital format.

The at least one map for display may include not only the DTM, or digital terrain model, but also ortho-photo maps, aerial photographs, space photographs, tactical maps, infrared maps, radar maps and geographical maps, all regarded as referring to maps.

The data acquisition system 200 shown in FIG. 13 also has display module 30 or computer display 30, which is configured for displaying output data to the operator, in superimposition onto at least one map. The operator is not shown in the Figs.

Furthermore, the display module 30 is configured to respond to inputs entered by the operator who may, for example, select a first location on the display module 30, such as a target or other location, and receive in response the location data of the designated first location. The data acquisition system 200 will then enter the received location data of the designated first location as the corrected location data for another second location previously calculated by the data acquisition system according to input data entered at the observation position when sighting a selected target.

In other words, when the operator designates a first location as input, the display replies with the location data of that first location. Then, following the selection or indication by the operator of the first location on the display module 30, the computer module 20 retrieves the location data of that first location in replacement for the location data of a previously calculated location data. The data acquisition system 200 now regards the first location as the point to which the sighting device is pointed, rather than the location previously calculated by the computer module 20. Next, the computer module 20 calculates the heading of the line of sight pointing from the observation position to the first location that the operator indicated on the display.

Thus, in response to an operator input designating a selected location on the display module 30, the computer module 20 is operated for the retrieval of location data of the selected location, and then, the computer module 20 replaces the location data of a previously calculated location with the location data of the selected location.

The sighting device 25 is aimed at the specific selected target SST or 406 and coupled to the computer module 20 for input therein of measured data including self-location data, line of sight, or LOS, heading and target data, typically azimuth and elevation angles, and range. In short, the sighting device 25 is assumed to include access to a source of location data, in addition to devices for measuring target data.

The source of location data is possibly a GPS receiver included in the sighting device 25, or any other accessible source for input of location data into the computer module 20. For example, the source of location data is selected alone and in combination from the group consisting of a source external to the sighting device 25, internal to the sighting device 25, external to the data acquisition system 200, and internal to the data acquisition system 200. In other words, the location data is possibly acquired by access to any available means, either internal to the data acquisition system 200 or external thereto, including location data derived from maps and/or listings.

The data acquisition system 200 may include devices for the measurement of target data, including: elevation angle, relative horizontal yaw angle, coarse azimuth heading, and means for the derivation of range data. Some or more of the cited measurement devices, such as a laser range finder, are possibly external to the sighting device 25 and to the data acquisition system 200.

It is noted that when practical, all the embodiments of the data acquisition system 200 described hereinbelow may use both active and inactive range acquisition means as described hereinabove to measure the range from the observation position 402 to the selected sighted target 406.

Once the operator has acquired the location data of the observation position and the target data, namely range as well as elevation and coarse azimuth heading 408 taken from the observation position 402 to the aimed specific selected target 406, these data are fed as input and are processed by the computer module 20.

The input data including respectively associated measurement errors limits are fed into the computer module 20 for processing. The measurement errors limits, which have extremes such as a maximum and a minimum, may be defined either as such, or by a default value, or numerically as a maximal RMS error.

In the first embodiment 1000, the PTAS computer program is fed with input data including location data, range, coarse azimuth heading and elevation angle measurements, and respectively associated measurement error limits.

The PTAS computer program, or a dedicated computer program, is also fed with input such as the associated measurement error limits of the observation's position self-position. These observation position limits, which have extremes such as a maximum and a minimum, may be defined as such, or by a default value, or numerically as the maximal RMS position error, such as given from a GPS receiver.

The computer module 20 is further operated for displaying at least one map on the display module 30, the map being usually selected according to the location data of the observation position 402.

In parallel, the computer module 20 runs at least one dedicated computer program to calculate the location data for the specific selected target 406 according to the input data. It is noted that with those embodiments wherefore the range is considered accurate, the elevation angle only serves the purpose of determining the horizontal range and altitude of the sighted target above sea level.

A further task of the computer module 20 is to calculate an error area 410 displayed as search zone surrounding the computed location of a calculated target 420. The error area 410 is delimited by measured-data error limits, with the location of the coarsely calculated target 420 being disposed within the search zone 410, which contains the specific selected target 406, as shown in FIG. 15.

Figure 16:
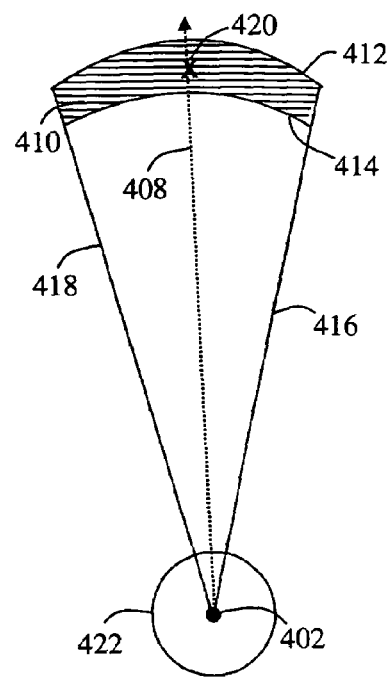
FIGS. 16, 17 and 18 present various types of search zones in association with observation position location errors.

FIG. 16 depicts the error limits as a first hatched geometrical shape 410. In embodiment 1000, the search zone is delimited by the displayed range error limits disposed along the coarse azimuth heading, and in perpendicular thereto, by the coarse azimuth heading error limits. In FIG. 16 for example, the upper and lower range error limits are shown, respectively, as curves 412 and 414, while the extreme azimuth heading error limits are delimited by, respectively, the radii 416 and 418 originating from the observation position location 402.

If more than one range distance measurement is taken during the active range measurements, such as in the case of multiple range indications occasionally received form an LRF, then several error areas, resulting in search zones, will be generated and superimposed if desired, according to the number of ranges acquired.

Errors in position location data are possibly considered as being contained within an error circle centered about the location of the observation position and delimited by the error limits. The extreme error limits are thus disposed on the periphery of the error circle, which circle generates a circular error area.

FIG. 16 also depicts the error circle 422 surrounding the observation position location 402. The periphery of the circle 422 delimits the extreme errors of the observation position location, which is disposed at the center of the error limit circle 422.

The operator receives the error area on display as a search zone generated according to azimuth and elevation errors on display as a first geometric shape, as shown in FIG. 16. To add and present a search zone including the data location error limits, the first geometric shape is possibly enlarged by virtually translating the position location position 402 along the periphery of the position error circle 422. Thereby, the originally created search zone 410, thus the first geometric shape 410, translates and generates a second geometric shape delimiting an enlarged total search zone area.

Figure 17:
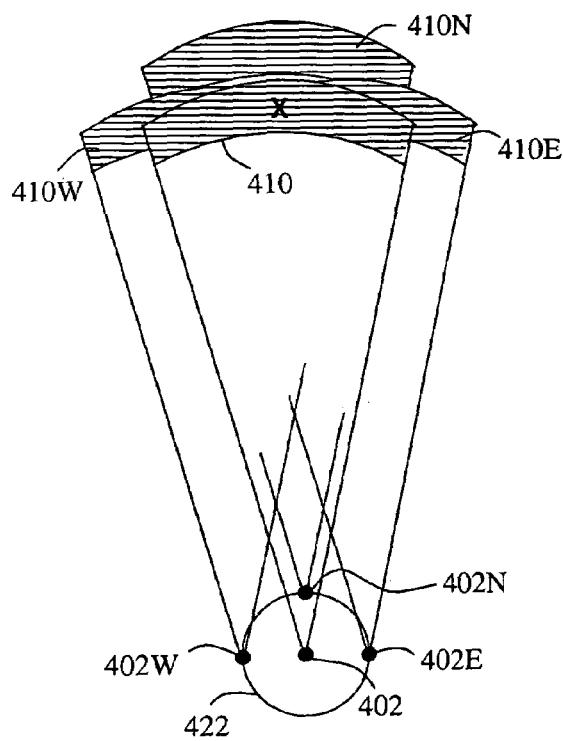

In FIG. 17, the observation position location 402 is shown surrounded by a few extreme position error limits, indicated as 402W, 402N, and 402E. The translation of the observation position location 402 along the extreme errors limit on the error circle 422 is evidently associated with the translation of a corresponding search zone 410.

As illustrated in FIG. 17, the search zones 410W and 410E correspond to, respectively, the observation position location 402W and 402E. Likewise, the search zone 410N corresponds to the observation position location 402N.

Optionally, the data location error limits are presented as a second geometric shape enlarging the size of the first geometric shape 410, thus enlarging the search zone, to encompass all measured data and position location error limits.

It noted that should the range error include dynamic errors, which depend on elevation errors, or else, range errors that vary in relation to different azimuth directions within the error area, then the shape of the error area may become asymmetric.

FIG. 18. shows an example of an asymmetric error zone 424.

On the display module 30 the search zone is superimposed on the at least one displayed map. If desired, more than at least one map are superimposed on the display module 30.

The operator is now prompted to search within the search zone limits shown on the display module 30 for the true location of the specific selected target 406. Once found and indicated, the computer module 20 will be operated for the retrieval of the location data of the specific selected target 406, and for the replacement of the location data of the previously calculated target location 420 with the true location data of the specific selected target 406, as corrective data for input into the computer module 20.

The at least one dedicated computer program is now ran again to calculate the true azimuth heading to which the sighting device 25 is aimed. The at least one dedicated computer program accepts the sighting device's heading aimed at the specific selected target 406 as the true azimuth, feeds back the true azimuth to the sighting device 25, and displays calculation result data. The feedback is intended specifically for the horizontal yaw sensor as a datum point wherefrom relative data readings are taken.

According to the procedure described hereinabove for the embodiment 1000, the data acquisition system 200 provides the true azimuth to the selected sighted target 406 from which a true North direction may be derived and used as input for further operation.

The concept of a method and of a system wherein a search zone is displayed to an operator who has to search for and find a location disposed within the interior of the search zone is also applicable to a stellar map for operation of the sighting device 200 at night. Although similar, there are differences between the first embodiment 1000 and a second embodiment 2000, which is now described.

With the second embodiment 2000 the data acquisition system 200, disposed at an observation position and possibly operating at night, points to the sky, aiming at a sighted celestial body. In agreement therewith, the computer module 20 runs computer programs including at least one dedicated celestial computer program and at least one celestial map. For example, the dedicated celestial computer program is a PTAS computer program receiving elevation angle measurement and coarse azimuth heading measurement as input data, and operating in association with at least one celestial map.

The display module 30 for displaying output data to the operator is the same as for embodiment 1000.

With embodiment 2000, alike embodiment 1000, the same sighting device 25 is aimed at a selected sighted celestial body and is coupled to the computer module 20 for input therein of data including location data and target data. For the sake of simplicity, as with embodiment 1000, the sighting device 25 is assumed to include access to a source of location data as described hereinabove, and devices for measuring target data.

For operation, the observation position location data are first acquired. Then, measured data including elevation angle and coarse azimuth heading and their respective measurement errors limits, as well as observation position location error limits are fed as input data into the computer module 20.

In response, the display module 30 displays to the operator at least one celestial map, which is selected according to the location data of the observation position, as well as the current date and the current time. If desired, the operator may choose to display more than one celestial map, either alone or in combination, such as for example a stellar map, or a constellation map, or a satellite map, or all of the available maps.

In turn, the computer module 20 is operated to run the celestial computer program to provide calculated star location data for the sighted celestial body according to input data, and to calculate an error area delimited by data error limits and displayed as a search zone delimited by data error limits. The data error limits regard the elevation angle error limits, which are disposed along the coarse azimuth heading and in perpendicular thereto and on both sides thereof, the coarse azimuth heading error limits. As expected, the calculated location of the sighted celestial body is disposed within the displayed search zone, which is superimposed onto at least one displayed celestial map.

The operator is now prompted to search within the search zone limits shown on the display module 30 for the true sighted celestial body. When found and indicated, the computer module 20 will operate to retrieve the location data of the sighted celestial body, and to replace the location data of the previously calculated star location with the true location data of the sighted celestial body, as corrective data for input into the computer module 20.

First, it is noted that the stellar system is dynamic, thus in continuous motion relative to the Earth, and that therefore all computations must be performed in real time to supply the correct momentary azimuth toward the celestial body. Second, that the items of interest to the operator in the search zone are only the distinct stellar bodies, and not the interstellar space.

The computer module 20 now runs the at least one celestial computer program to calculate and accept the heading of the sighting device, which is still aimed at the sighted celestial body, as the true azimuth, to provide and if desired, to display calculation result data, and to feed back the calculated true azimuth to the sighting device. The feedback is intended specifically for the horizontal yaw sensor as a datum point wherefrom relative data readings are taken.

According to the procedure described hereinabove for the embodiment 2000, the data acquisition system 200 provides the true azimuth from which a true North direction may be derived and used as input for further operation.

The concept of a method and of a system wherein a search zone is displayed to an operator who has to search for and find a location disposed within the interior of the search zone is also applicable to a situation when access to a common source of location data is unavailable. This occurs, for example, in a GPS deficient environment or when a GPS receiver is inoperative. Although similar, there are differences between the first embodiment 1000 and a third embodiment 3000, which is now described.

As with the previously described embodiments 1000, the sighting device 25 is first leveled, physically or digitally, and then aimed at a specific selected target 406 on the terrain surrounding the observation position 402. With embodiment 3000, the specific selected target 406 is a target that is chosen by, recognized as being known to the operator, and for which location data are available, for example, with reference to a digital map or a listing of locations.

According thereto, the operator selects at least one appropriate map for display on the computer display 30. If desired, more than one map is displayed in superimposition on the display module 30. The maps for display may include not only the DTM, or digital terrain module or map, but also ortho-photo maps, aerial photographs, space photographs, tactical maps, infrared maps, radar maps and geographical maps, all regarded as referring to maps.

The operator is prompted to search for the specific selected target 406 on the computer display 30. Since the operator himself selected a recognized and well-known target, this task is fast. When the specific selected target 406 is found and indicated, the computer module 20 is operated for retrieval of the location data of the specific selected target 406, together with the associated error limits, for input into the computer module 20, and Next, the sighting device is operated to measure and feed coarse azimuth heading, relative horizontal yaw angle, elevation angle, and range into the computer module 20, including their respective associated measurement errors limits and the position error limits.

The computer module 20 is then commanded to accept the specific selected target 406 now having known location data, as a temporary observation position, and to accept the actual observation position 406, still with unknown location data as a temporary target. In other words, the operator switches locations: The specific selected target 406 now momentarily becomes a temporary observation position, whereas the actual observation position is regarded for the moment as a temporary target. This switch of locations is achieved by either adding p radians to or subtracting p radians from the measured coarse azimuth heading and by multiplying the measured elevation angle by −1. Thereby, the directions of the heading of the coarse azimuth and the elevation angle are reversed. The situation presented to the computer module 20 is now as if the operator was sighting the actual observation location from the temporary target, which was initially the specific selected target 406.

It is now to the computer module 20 to run at least one dedicated computer program to calculate and display the temporary target surrounded by an error area delimited by the data error limits and displayed as a search zone, and to provide temporary target location data. With the third embodiment 3000, the search zone is delimited by the error limits of the specific selected target location and of the acquired range, which are disposed in the direction of the coarse azimuth, and in perpendicular thereto and on both sides thereof, by the error limits of the coarse azimuth heading.

It is noted that in an embodiment wherein the range is considered accurate, the elevation angle only serves the purpose of determining the horizontal range and the altitude of the sighted target above sea level.

It is also noted that should the range error include dynamic errors, which depend on elevation errors, or range errors that vary in relation to different azimuth directions within the error zone, then the shape of the error zone may become asymmetric, as shown in FIG. 18.

In the third embodiment 3000, the dedicated computer program is possibly selected as the PTAS computer program. If so, then the PTAS computer program is fed with input data including acquired range measurement, azimuth and elevation angle measurements, and the respectively associated measurement error limits.

In turn, the operator is prompted to search within the search zone limits shown on the computer display 30 for the location of the temporary target, and when found and indicated, the data acquisition system replaces the location data of the temporary target with the location data of the actual observation position as input into the computer module, enabling true azimuth calculation as input into the computer module 20 enabling true azimuth calculation.

Thereby, the location data of the actual observation position are known, and the true azimuth heading which is the heading of the vector, or line of sight connecting the observation position 402 to the specific selected target 406 is acquired and fed back to the sighting device. The feedback is intended specifically for the horizontal yaw sensor as a datum point wherefrom relative data readings are taken. Hence, the true azimuth heading is now known, from which a true North direction may be derived. Both the true North direction and the location data of the actual observation position are for use, if desired, as input for further operation.

The procedure described and related to embodiment 3000 is repeatable in sequence, if desired, to reduce the area of the search zone displayed to the operator. The sequence requires the operator to repeat the first selected target acquisition procedure, namely to choose at least one additional specific selected target that is recognized as being known and has location data which are available to the operator.

As previously described hereinabove, for each sequence including at least one additional specific selected target recognized as known and having location data which are available to the operator, the computer module 20 displays an additional search zone for superimposition onto previously displayed search zone(s). It is the overlap area of each additional search zone in common with each and all of the preceding search zone(s) that reduces the size of the area to be searched by the operator. The operator can stop the repetitive process as desired when the location data of the true observation position 402 is found. Repeating the sequence makes it easier for the operator to find his own location data on the real life representation of the terrain, such as on an ortho-photo, regardless of numerical calculated location error.

The procedure described hereinabove in relation to the first, second and third embodiment, respectively 1000, 2000, and 3000, is also operable with inactive and passive sighting means. Instead of taking advantage of actively acquired range measurement, the sighting device is operated inactively or passively to measure and feed only observation position data, or temporary observation position data, coarse azimuth heading and elevation angle to the computer module 20, including respectively associated measurement error limits. It is remembered that actively acquired range measurement is not practical with the second embodiment.

As before, the operator selects at least one appropriate map, for example a DTM or digital terrain model, if desired with an ortho-photo in superimposition, for display on the computer display 30. If desired, more than one map is displayed in superimposition on the display module 30. The maps for display may include not only the DTM, or digital terrain model, but also ortho-photo maps, aerial photographs, space photographs, tactical maps, infrared maps, radar maps and geographical maps, all regarded as referring to maps.

The procedure is the same as that for the first to the third embodiment, respectively 1000 to 3000, but for the PTAS computer program, to which the sighting device 25 feeds the observation position location data, or temporary observation position location data, a coarse azimuth heading and an elevation angle.

Likewise, even though passive sighting means are used, and since the PTAS computer program delivers a search zone containing the specific selected target 406, the result is the same: the true azimuth heading is obtained, from which a true North direction may be derived. Both the true North direction and the location data of the actual observation position are useable, if desired, as input for further operation.

The procedure of embodiment 3000 is thus repeatable and operative with active, inactive, and passive sighting means, if desired, the purpose of each repeated sequence being to reduce the area of the search zone displayed to the operator.

It is noted that passive acquisition means relate to both passive sighting means, and also to maps, documents, and pictures and listings. It is also noted that a passive sighting means usually generates an asymmetric search zone, as shown in FIG. 18.

It will be appreciated by persons skilled in the art, that the present invention is not limited to what has been particularly shown and described hereinabove. For example, various devices or data sources may possibly be used to provide input to the PTAS and to the NFP. Furthermore, the PTAS is possibly acquired as readily available equipment, or assembled to integrate the various modules necessary to operate the invention. Still another possibility is to add and integrate with existing systems, those missing modules, which are necessary for the operation of the invention. Separate modules may be integrated to form a sighting system. For example, one may couple and integrate a bare sighting system to a computer, to a display, to a GPS unit, to a compass, and to a laser range finder (LRF). When all the necessary modules are present on an already existing platform, then all there is needed to implement the PTAS method and system is the integration of the computer application programs with the computer module. It is understood that manual and visual tasks may be achieved automatically. This regards for example to the visual detection of a target that may also be detected automatically by use, typically, of image processing means. Rather, the scope of the present invention is defined by the appended claims and includes both combinations and sub-combinations of the various features described hereinabove as well as variations and modifications thereof which would occur to persons skilled in the art upon reading the foregoing description.

The invention claimed is:

1. A method for obtaining a true azimuth heading for correcting a coarse azimuth heading measured from an observation position to a specific selected target by operating a data acquisition system disposed at the observation position, comprising:
a computer module running computer programs including at least one dedicated computer program and at least one map,
a computer display coupled to the computer module for:
displaying output data to the operator in superimposition onto the at least one map, and for
responding to an operator input designating a selected location thereon by operation of the computer module for:
retrieval of location data of the selected location, and
replacement of location data for a previously calculated location with location data of the selected location,
a sighting device aimed at the specific selected target and coupled to the computer module for input therein of data including location data and target data, the sighting device including:
access to a source of location data,
devices for measuring target data, including elevation angle, relative horizontal yaw angle, coarse azimuth heading, and means for deriving range data,
the method comprising the steps of:
feeding input data into the computer module including location data, target data and associated errors limits, and operating the computer module for:
displaying the at least one map selected according to observation position location data,
running the at least one dedicated computer program to provide calculated target location data for the specific selected target according to input data, and to calculate an error area delimited by data error limits and displayed as a search zone, the calculated target location being disposed within the search zone containing the specific selected target, and
superimposing the search zone on the at least one displayed map,
prompting the operator to search within the search zone limits shown on the display module for the true location of the specific selected target, which when found and indicated, operates the computer module for:
retrieval of location data of the specific selected target, and
replacement of location data of the previously calculated target location with the true location data of the specific selected target, and
operating the at least one dedicated computer program to calculate and accept the sighting device's heading aimed at the specific selected target as the true azimuth, to feedback the true azimuth to the sighting device, and to display calculation result data,
whereby the data acquisition system provides true azimuth from which a true North direction may be derived and used as input for further operation.

2. The method according to 1, wherein:
the source of location data for input into the computer module is selected alone and in combination from the group consisting of a source external to the sighting device, internal to the sighting device, external to the data acquisition system, and internal to the data acquisition system.

3. The method according to claim 1, wherein:
means for deriving range data include the sighting device, a dedicated computer program, maps and listings, wherein maps are selected alone and in combination from the group of maps consisting of digital terrain maps, ortho-photo maps, aerial photographs, space photographs, tactical maps, infrared maps, radar maps and geographical maps.

4. The method according to claim 1, wherein:
range data are derived as a distance taken from either one of both an active range measurement device and an inactive range data source.

5. The method according to claim 1, wherein:
the search zone is delimited by range measurement error limits, by coarse azimuth heading error limits, and by position error limits.

6. The method according to claim 1, wherein:
the at least one map is selected alone and in combination from the group of maps consisting of digital terrain maps, ortho-photo maps, aerial photographs, space photographs, tactical maps, infrared maps, radar maps and geographical maps.

7. The method according to claim 1, wherein:
more than at least one map are superimposed on the computer display.

8. The method according to claim 1, wherein:
the dedicated computer program is a PTAS computer program being fed with input data including observation position location, range data, azimuth and elevation angle measurements, and associated data error limits.

9. The method according to claim 1, wherein:
the data acquisition system points to a sighted celestial body,
the computer module runs computer programs including at least one dedicated celestial computer program and at least one celestial map,
the sighting device aims at the sighted celestial body and is coupled to the computer module for input therein of data including location data and target data, the sighting device including:
  access to a source of location data,
  target data measuring devices to measure elevation angle and coarse azimuth heading,
and wherein:
  acquired data including observation position location data, elevation angle and coarse azimuth heading and measurement-associated errors limits are fed as input data into the computer module which is operated for:
    displaying the at least one celestial map selected according to the observation position location data, current date and current time,
    running the at least one celestial computer program to provide calculated star location data for the sighted celestial body according to input data, and to calculate an error area displayed as a search zone delimited by data error limits, the calculated star location being disposed within the search zone containing the sighted celestial body, and
    superimposing the search zone on the at least one displayed celestial map,
    prompting the operator to search within the search zone limits shown on the display module for the true sighted celestial body, which when found and indicated, operates the computer module for:
      retrieval of location data of the sighted celestial body, and
      replacement of location data of the previously calculated star location with the true location data of the sighted celestial body as corrective data for input into the computer module, and
    operating the at least one celestial computer program to calculate and accept the sighting device's heading aimed at the sighted celestial body as the true azimuth, feeding back the true azimuth to the sighting device, and providing calculation result data,
  whereby the data acquisition system provides true azimuth from which a true North direction may be derived and used as input for further operation.

10. The method according to claim 9, wherein:
the source of location data for input into the computer module is selected alone and in combination from the group consisting of a source external to the sighting device, internal to the sighting device, external to the data acquisition system, and internal to the data acquisition system.

11. The method according to claim 9, wherein:
more than at least one map are superimposed on the computer display.

12. The method according to claim 9, wherein:
the at least one map for display is selected alone and in combination from the group of maps consisting of stellar maps, constellation maps, and satellite maps.

13. The method according to claim 9, wherein:
the search zone is delimited by coarse azimuth heading error limits, by elevation angle error limits, and by position error limits.

14. The method according to claim 9, wherein:
the dedicated celestial computer program is a PTAS computer program being fed with input data including observation position location data, elevation angle, coarse azimuth heading and associated error limits.

15. The method according to claim 1, for operation of the data acquisition system with either one of both a GPS deficient environment and an inoperative GPS receiver, as a procedure to derive a true azimuth and observation position location data, wherein:
the sighting device is aimed at a specific selected target that is chosen and recognized by the operator and for which location data are available,
the operator selects at least one appropriate map for display on the computer display,
the operator is prompted to search for the specific selected target on the computer display, which when found and indicated, operates the computer module for retrieval of location data of the specific selected target, together with associated error limits, for input into the computer module, and
the sighting device is operated to derive and feed coarse azimuth heading, relative horizontal yaw angle, elevation angle, range, and associated data error limits, as input data into the computer module,
the computer module is commanded to:
  accept the specific selected target having known location data as a temporary observation position, and accept the actual observation position having unknown location data as a temporary target, by adding p radians to or subtracting p radians from the measured coarse azimuth heading and by multiplying the measured elevation angle by −1, and run at least one dedicated computer program to calculate and display the temporary target surrounded by an error area delimited by the data error limits and displayed as a search zone, and to provide temporary target location data, and the operator being prompted to search within the search zone limits shown on the computer display for the true location of the temporary target, and when found and indicated, the data acquisition system replaces the location data of the temporary target with the location data of the actual observation position as input into the computer module, enabling true azimuth calculation and feedback to the sighting device, whereby a true azimuth is obtained from which a true North direction may be derived, in addition to the location data of the observation position, all useable as input for further operation.

16. The method according to claim 15, wherein:
the procedure is repeatable in successive sequences, each sequence requiring one additional specific selected target recognized by and having location data which are available to the operator, to display one additional search zone for superimposition on a previously displayed search zone, whereby a common-area overlap of search zones reduces the size of the area to be searched by the operator.

17. The method according to claim 15, wherein:
the at least one map for display is selected alone and in combination from the group of maps consisting of digital terrain maps, ortho-photo maps, aerial photographs, space photographs, tactical maps, infrared maps, radar maps, and geographical maps.

18. The method according to claim 15, wherein:
more than at least one map are superimposed on the computer display.

19. The method according to claim 15, wherein:
the at least one computer program is a PTAS computer program receiving temporary observation position, coarse azimuth heading, elevation angle, range, and associated error limits as input data.

20. The method according to claim 15, wherein:
the procedure is repeatable in sequence with at least one additional specific selected target recognized by and having location data which are available to the operator, to display at least one additional search zone for superimposition on a previously displayed search zone, whereby an overlap area of search zones reduces the size of the area to be searched by the operator.

21. The method according to claim 15, wherein:
the range is derived by means including the sighting device, a dedicated computer program, maps and listings,
wherein maps are selected alone and in combination from the group of maps consisting of digital terrain maps, ortho-photo maps, aerial photographs, space photographs, tactical maps, infrared maps, radar maps and geographical maps.

22. The method according to claim 15, wherein:
the range is derived as a distance taken from either one of both an active range measurement device and an inactive range data source.

23. The method according to claim 15, wherein:
the at least one map for display is selected as a digital terrain map.

24. The method according to claim 15, wherein:
the at least one map for display is selected alone and in combination from the group of maps consisting of digital terrain maps, ortho-photo maps, aerial photographs, space photographs, tactical maps, infrared maps, radar maps and geographical maps.

25. The method according to claim 15, wherein:
more than at least one map are superimposed on the computer display.

26. A system for correcting a coarse azimuth heading with a true azimuth heading, the coarse azimuth heading being measured from an observation point to a specific selected target by operating a data acquisition system disposed at the observation point, comprising:
a computer module running computer programs including at least one dedicated computer program and at least one map,
a computer display coupled to the computer module, which commands:
display of output data to the operator in superimposition onto at least one map, and
response to an operator input designating a selected location thereon by operation of the computer module for:
retrieval of location data of the selected location, and
replacement of location data for a previously calculated location with location data of the selected location,
a sighting device aimed at the specific selected target and coupled to the computer module for input therein of measured data including location data and target data, the sighting device including:
access to a source of location data,
devices for measuring target data, measurement of elevation angle, relative horizontal yaw angle, coarse azimuth heading, and means for deriving range data,
the system comprising:
input data including location data, target data and associated errors limits,
being fed as input into the computer module which is operated to command:
display of the at least one map selected according to observation point location data,
operation of at least one dedicated computer program to provide calculated target location data for the specific selected target according to input data, and to calculate an error area delimited by data error limits and displayed as a search zone, the calculated target location being disposed within the search zone containing the specific selected target, and
superimposition of the search zone on the at least one displayed map,
the operator being prompted to search within the search zone limits shown on the display module for the true location of the specific selected target, which when found and indicated, operates the computer module for:
retrieval of location data of the specific selected target, and
replacement of location data of the previously calculated target location with the true location data of the specific selected target, and
the dedicated computer program being operated to calculate and accept the sighting device's heading aimed at the specific selected target as the true azimuth, to feedback the true azimuth to the sighting device, and to display calculation result data, whereby the data acquisition system provides true azimuth from which a true North direction may be derived and used as input for further operation.

27. The system according to claim 26, wherein:
the source of location data for input into the computer module is selected alone and in combination from the group consisting of a source external to the sighting device, internal to the sighting device, external to the data acquisition system, and internal to the data acquisition system.

28. The system according to claim 26, wherein:
means for deriving range data include the sighting device, a dedicated computer program, maps and listings,
wherein maps are selected alone and in combination from the group of maps consisting of digital terrain maps, ortho-photo maps, aerial photographs, space photographs, tactical maps, infrared maps, radar maps and geographical maps.

29. The system according to claim 26, wherein:
range data is derived as a distance taken from either one of both an active range measurement device and an inactive range data source.

30. The system according to claim 26, wherein:
the search zone is delimited by range measurement error limits, by coarse azimuth heading error limits, and by position error limits.

31. The system according to claim 26, wherein:
the at least one map is selected alone and in combination from the group of maps consisting of digital terrain maps, ortho-photo maps, aerial photographs, space photographs, tactical maps, infrared maps, radar maps and geographical maps.

32. The system according to claim 26, wherein:
more than at least one map are superimposed on the computer display.

33. The system according to claim 26, wherein:
the dedicated computer program is a PTAS computer program being fed with input data including observation position location, range data, azimuth and elevation angle measurements, and associated data error limits.

34. The system according to claim 26, wherein:
the data acquisition system points to a sighted celestial body,
the computer module runs computer programs including at least one dedicated celestial computer program and at least one celestial map,
the sighting device aims at the sighted celestial body and is coupled to the computer module for input therein of data including location data and target data, the sighting device including:
access to a source of location data,
target data measuring devices to measure elevation angle and coarse azimuth heading,
and wherein:
acquired data including observation position location data, elevation angle and coarse azimuth heading and measurement-associated errors limits are fed as input data into the computer module which is operated for:
displaying the at least one celestial map selected according to the observation position location data, current date and current time,
running the at least one celestial computer program to provide calculated star location data for the sighted celestial body according to input data, and to calculate an error area displayed as a search zone delimited by data error limits, the calculated star location being disposed within the search zone containing the sighted celestial body, and
superimposing the search zone on the at least one displayed celestial map,
prompting the operator to search within the search zone limits shown on the display module for the true sighted celestial body, which when found and indicated, operates the computer module for:
retrieval of location data of the sighted celestial body, and
replacement of location data of the previously calculated star location with the true location data of the sighted celestial body as corrective data for input into the computer module, and
operating the at least one celestial computer program to calculate and accept the sighting device's heading aimed at the sighted celestial body as the true azimuth, feeding back the true azimuth to the sighting device, and providing calculation result data,
whereby the data acquisition system provides true azimuth from which a true North direction may be derived and used as input for further operation.

35. The system according to claim 34, wherein:
the source of location data for input into the computer module is selected alone and in combination from the group consisting of a source external to the sighting device, internal to the sighting device, external to the data acquisition system, and internal to the data acquisition system.

36. The system according to claim 34, wherein:
more than at least one map are superimposed on the computer display.

37. The system according to claim 34, wherein:
the at least one map for display is selected alone and in combination from the group of maps consisting of stellar maps, constellation maps, and satellite maps.

38. The system according to claim 34, wherein:
the search zone is delimited by coarse azimuth heading measurement error limits, by elevation angle measurement error limits, and by position error limits.

39. The system according to claim 34, wherein:
the dedicated celestial computer program is a PTAS computer program being fed with input data including observation position location data, elevation angle, coarse azimuth heading and associated error limits.

40. The system according to claim 26, for operation of the data acquisition system with either one of both a GPS deficient environment and an inoperative GPS receiver, as a procedure to derive a true azimuth and observation position location data, wherein:
the sighting device is aimed at a specific selected target that is chosen and recognized by the operator and for which location data are available,
the operator selects at least one appropriate map for display on the computer display,
the operator is prompted to search for the specific selected target on the computer display, which when found and indicated, operates the computer module for retrieval of location data of the specific selected target, together with associated error limits, for input into the computer module, and
the sighting device is operated to derive and feed coarse azimuth heading, relative horizontal yaw angle, elevation angle, range, and associated data error limits, as input data into the computer module, the computer module is commanded to:
- accept the specific selected target having known location data as a temporary observation position, and accept the actual observation position having unknown location data as a temporary target, by adding p radians to or subtracting p radians from the measured coarse azimuth heading and by multiplying the measured elevation angle by −1, and
- run a dedicated computer program to calculate and display the temporary target surrounded by a search zone, which is delimited by the error limits of the range and of the coarse azimuth heading, and to display the specific selected target location, and the operator is prompted to search within the search zone limits shown on the computer display for the true location of the temporary target, and when found and indicated, replaces the location data of the temporary target with the location data of the actual observation position as input into the computer module, enabling true azimuth calculation and feed back to the sighting device, whereby a true azimuth is obtained from which a true North direction may be derived, in addition to the location data of the observation position, all useable as input for further operation.

41. The system according to claim 40, wherein:

the procedure is repeatable in successive sequences, each sequence requiring one additional specific selected target recognized by and having location data which are available to the operator, to display one additional search zone for superimposition on a previously displayed search zone, whereby a common-area overlap of search zones reduces the size of the area to be searched by the operator.

42. The system according to claim 40, wherein:

the at least one map for display is selected alone and in combination from the group of maps consisting of digital terrain maps, ortho-photo maps, aerial photographs, space photographs, tactical maps, infrared maps, radar maps, and geographical maps.

43. The system according to claim 40, wherein:

more than at least one map are superimposed on the computer display.

44. The system according to claim 40, wherein:

the at least one computer program is a PTAS computer program receiving temporary observation position, coarse azimuth heading, elevation angle, range, and associated error limits as input data.

45. The system according to claim 40, wherein:

the procedure is repeatable in sequence with at least one additional specific selected target recognized by and having location data which are available to the operator, to display at least one additional search zone for superimposition on a previously displayed search zone, whereby an overlap area of search zones reduces the size of the area to be searched by the operator.

46. The system according to claim 40, wherein:

the range is derived by means including the sighting device, a dedicated computer program, maps and listings, wherein maps are selected alone and in combination from the group of maps consisting of digital terrain maps, ortho-photo maps, aerial photographs, space photographs, tactical maps, infrared maps, radar maps and geographical maps.

47. The system according to claim 40, wherein:

the range is derived as a distance taken from either one of both an active range measurement device and an inactive range data source.

48. The system according to claim 40, wherein:

the at least one map for display is selected as a digital terrain map.

49. The system according to claim 40, wherein:

the at least one map for display is selected alone and in combination from the group of maps consisting of digital terrain maps, ortho-photo maps, aerial photographs, space photographs, tactical maps, infrared maps, radar maps and geographical maps.

50. The method according to claim 40, wherein:

more than at least one map are superimposed on the computer display.

* * * * *